United States Patent
Salewski

(10) Patent No.: US 11,847,526 B2
(45) Date of Patent: Dec. 19, 2023

(54) RECORDING MULTIMODAL USER INTERACTION WITH ITEMS IN REAL AND DIGITAL ENVIRONMENTS

(71) Applicant: SCROBLE S.A., Luxembourg (LU)

(72) Inventor: Anna Ivanovna Salewski, Luxembourg (LU)

(73) Assignee: SCROBLE S.A., Luxembourg (LU)

(*) Notice: Subject to any disclaimer, the term of this patent is extended or adjusted under 35 U.S.C. 154(b) by 70 days.

(21) Appl. No.: 17/259,718

(22) PCT Filed: Oct. 10, 2019

(86) PCT No.: PCT/EP2019/077484
§ 371 (c)(1),
(2) Date: Jan. 12, 2021

(87) PCT Pub. No.: WO2020/074644
PCT Pub. Date: Apr. 16, 2020

(65) Prior Publication Data
US 2021/0232787 A1    Jul. 29, 2021

Related U.S. Application Data

(60) Provisional application No. 62/744,637, filed on Oct. 11, 2018.

(51) Int. Cl.
*G06K 7/14* (2006.01)
*G06K 7/10* (2006.01)
*G06K 19/06* (2006.01)

(52) U.S. Cl.
CPC ....... *G06K 7/1417* (2013.01); *G06K 7/10366* (2013.01); *G06K 19/06037* (2013.01)

(58) Field of Classification Search
CPC ............. G06K 7/1417; G06K 7/10366; G06K 19/06037
See application file for complete search history.

(56) References Cited

U.S. PATENT DOCUMENTS

2012/0191817 A1    7/2012    Sayan
2013/0222116 A1    8/2013    Barry
(Continued)

OTHER PUBLICATIONS

Gao J Z et al., "Understanding 2D-BarCode Technology and Applications in M-Commerce—Design and Implementation of a 2D Barcode Processing Solution", Computer Software and Applications Conference, 2007. COMPSAC 2007. 31st Annual International, IEEE, Piscataway, NJ, USA,Jul. 24, 2007 (Jul. 24, 2007), p. 49-56.

*Primary Examiner* — Laura A Gudorf
(74) *Attorney, Agent, or Firm* — Dickinson Wright PLLC; Andrew D. Dorisio

(57) ABSTRACT

A method and a corresponding system are disclosed for recording multimodal user interaction with an item in a networked system. The networked system includes a server device network-connected to one or more client user device(s). A data record is generated for the item, comprising data representative thereof and including at least image data depicting the item. A unique identifier code is associated with the data record, wherein the association of the unique identifier code with the image data in the record defines an avatar of the item in the system. Copies of the avatar are distributed to client user devices in the network, and the unique identifier code is encoded into a machine-readable tag secured to each physical embodiment of the item outside the network. At each client user device, each digital user interaction with an avatar and each analogue user interaction with a physical item is logged. At the server, each logged user interaction is matched against the item data record and recorded.

14 Claims, 16 Drawing Sheets

(56) References Cited

U.S. PATENT DOCUMENTS

| | | | |
|---|---|---|---|
| 2016/0036929 A1* | 2/2016 | Leal | G06Q 30/02 709/224 |
| 2017/0011127 A1* | 1/2017 | Hu | G06F 16/9535 |

\* cited by examiner

RECORDING MULTIMODAL USER INTERACTION WITH ITEMS IN REAL AND DIGITAL ENVIRONMENTS

This application is the national stage of International Patent Application No. PCT/EP2019/077484 filed on Oct. 10, 2019, which in turn claims priority from U.S. Provisional Patent Application No. 62/744,637 filed on Oct. 11, 2018, the disclosures of which are incorporated herein by reference in their entirety.

TECHNICAL FIELD

The present invention relates to a computer implemented method of recording multimodal user interaction with items in both real and digital environments, and to a system implementing this method.

BACKGROUND

Retailing items, whether manufactured physical articles or virtual types such as digital vouchers, assets and software functionalities, currently involves a heterogeneous mix of distribution channels, including traditional retail stores and internet-based digital stores. Both real and virtual types of distribution channels involve management of inventory and identification of items using unique identifier codes, which may be unique sets of digits and/or letters, and/or machine-readable sequences or constructs.

A same item available for sale at the same or different retailer(s) may have distinct identifier codes, according to whether that item is made available for sale online, or in a real store, or jointly in both, moreover according to whether retail-channel specific forms of it exist, as in the case of digital items embodied as credit card-sized vouchers for physical store distribution.

Furthermore different manufacturers, retailers and department stores frequently use different identification codes for a same item, each according to their own nomenclature and/or identification system and/or enterprise systems, and which or may not be subjected to statutory formatting or symbology requirements, for instance according to the International or European Article Number standards.

In relation to physical goods made available at physical stores, consumers are typically limited to the inventory, selection and available styles of items available at each particular retail location whereby, far from homogenising data generated from the physical and digital sales of items and their returns, that are heavily relied upon by goods manufacturers and service providers for optimising the planning, production, shipping and stockholding of goods, this haphazard approach to referencing items in distribution channels contributes to fragment that data ever more, and so to inhibit attempts at gaining useful insights from consumer interactions with the items both pre- and post-transactions, regardless of the physical or virtual context of such interactions.

Similar practical limitations remain in a digital retail context wherein, notwithstanding the substantial advantage conferred by remotely accessing a variety of virtual outlets from a same consumer device at a single location at a particular moment in time, consumers are nevertheless still limited to the inventory, selection and available styles of items available at each particular retail website, moreover each with its own interfacing implementation and idiosyncrasies.

This situation endures as there is presently no platform-independent data processing solution apt to bridge the physical and digital goods distribution environments from a retail data perspective, so that goods designers, manufacturers, retailers and other stakeholder may gain an improved understanding of how consumers interact with their wares in both environments irrespective, based on objective, qualitative and auditable interaction data.

SUMMARY

The present invention is concerned with capturing and tracking the interaction of users with items in both real and virtual retail channels indiscriminately, wherein "item" is to be understood as any physical or digital good and/or service capable of being selected for use and inter alia purchased by a user, and wherein any digital good and/or service is capable of being embodied physically for a selection in an analogue context, typically a physical retail environment.

The principles of the present invention have high relevance to physical goods which answer a human necessity, but which generate a high degree of redundant inventory and transport operations conducive of material waste, through consumer returns of items that are attributable to sub-optimal or misjudged item designing, manufacturing and/or stocking, based on insufficient and/or imperfect data for objectively qualifying the expectations of a target audience, manifesting for example as the customer disconnect between the virtual representation of an item at the time of its digital selection and its physical form at the time of physical delivery post-selection causing disappointment with the physical item and its consequential return.

Accordingly, in a first aspect of the invention, there is provided a method of recording multimodal user interaction with an item in a networked system, the networked system comprising at least one server device connected to at least one client device across at least one network, the method comprising the steps of generating a data record comprising data representative of the item, the data including at least image data depicting the item; generating and associating a unique identifier code with the data record, wherein associating at least the image data in the data record with the unique identifier code defines an avatar of the item in the networked system; distributing one or more copies of the avatar to the or each client device; encoding the unique identifier code into a machine-readable tag and securing the tag to each physical embodiment of the item outside the networked system; at the or each client device, logging digital user interaction with the avatar and analogue user interaction with the physical item, wherein logging analogue user interaction comprises reading the machine-readable tag with the client device; and matching and recording each logged user interaction against the item data record at the or each server device.

In an embodiment of the method, the step of logging analogue user interaction may comprise the further steps of determining a geographical location of the client device and associating the determined location with the reading of the machine-readable tag.

In a further, alternative or complementary embodiment of the method, the step of logging digital user interaction may comprise the further step of determining a network location of the distributed avatar and associating at least the network location with the digital user interaction, A variant of this embodiment may further determine a geographical location of the network location, before associating with the digital user interaction.

A further, alternative or complementary embodiment of the method, may comprise the further steps of generating and storing a user account for each user of the networked system, each user account having at least one respective type selected from a group comprising at least an item provider and an item consumer; and authenticating access of each client device to the networked system through logging each user's client device into the user's respective user account.

In a first variant of this embodiment, the item provider of the group of selectable user account types may further comprise an item manufacturer type and an item retailer type; and/or the group of selectable user account types may further comprise an item referrer and a third party data supplier.

A second, alternative or complementary variant may comprise the further steps of matching and recording each logged user interaction against the respective user account of the client device logging the user interaction.

In a third, alternative or complementary variant, the data representative of the item can only be generated at a client device logged into a user account of the item provider type.

A fourth, alternative or complementary variant may comprise the further step of removably linking at least one data record with at least one user account.

A first variant of this last embodiment may comprise the further steps of generating and storing a list of each data record linked with a user account and updating the list according to logged user interaction recorded against the user account.

In a second, alternative or complementary variant, the step of distributing one or more copies of the avatar to the or each client device may comprise the further step of distributing these copies according to the list of data record(s) linked with the user account authenticating a client device.

A third, alternative or complementary variant including the steps of determining a geographical location of the client device and associating it with the reading of the machine-readable tag, may comprise the further steps of determining a first geographical location, being a location of a client device logged into a user account; determining a second geographical location, being a location of at least one physical item having a respective data record linked with the user account; and when the first and second geographical locations are within a predetermined distance of each other, distributing a copy of the avatar corresponding to the data record of the item to the client device logged into the user account, as a notice of item proximity.

In a fourth variant optionally including the respective steps of the first, second and/or third variants, the logged user interaction at the list updating step is preferably digital or analogue user interaction representative of a transaction for a physical embodiment of the item outside the networked system.

An embodiment of the method may comprise the further steps of providing each client device with a messaging interface to all other client devices in the networked system; allowing each client device to message one or more remote client devices in the networked system through the interface; and preventing a message from being sent in the networked system until and unless at least one logged user interaction is associated with the message.

In an embodiment of the method, the step of generating a data record may comprising data representative of the item may further comprise encoding the item data record in a blockchain data structure, and the step of recording each logged user interaction against the item data record may comprise encoding each matched logged user interaction against the item data record in the blockchain data structure.

In a variant of this embodiment, data representative of the item in the data record encoded in the Blockchain data structure preferably includes at least image data depicting the item and authentication data guaranteeing a manufacturing origin of each physical embodiment of the item.

According to another aspect of the invention, there is also provided a system for recording multimodal user interaction with an item, the system comprising at least one server device connected to at least one client device across at least one network, wherein the or each server is configured to generate a data record comprising data representative of the item, the data including at least image data depicting the item; generate and associate a unique identifier code with the data record, wherein associating at least the image data in the data record with the unique identifier code defines an avatar of the item in the system; distribute one or more copies of the avatar to the or each client device; and match and record each user interaction logged at one or more client device against the item data record; the system further comprising at least one machine-readable tag, into which the unique identifier code is encoded and which is secured to each physical embodiment of the item outside the system; and wherein the or each client device is configured both to log digital user interaction with the avatar and to log analogue user interaction with the physical item by reading the machine-readable tag secured thereto.

According to a further aspect of the invention, there is also provided a computer program product for recording multimodal user interaction with an item in a networked system comprising at least one server device connected to at least one client device across at least one network, wherein the computer program product is executable by the or each server device and configures same to generate a data record comprising data representative of the item, the data including at least image data depicting the item; generate and associate a unique identifier code with the data record, wherein associating at least the image data in the data record with the unique identifier code defines an avatar of the item in the system; distribute one or more copies of the avatar to the or each client device; and match and record each user interaction logged at one or more client device against the item data record; the server-generated unique identifier code being encoded into at least one machine-readable tag secured to each physical embodiment of the item outside the networked system; and the or each client device being configured both to log digital user interaction with the avatar and to log analogue user interaction with the physical item by reading the machine-readable tag secured thereto.

Other aspects of the present invention are as stated in the appended claims.

BRIEF DESCRIPTION OF THE DRAWING FIGURES

Embodiments of the present invention will now be described by way of example only, with reference to accompanying drawings, which are as follows.

Figure 1:
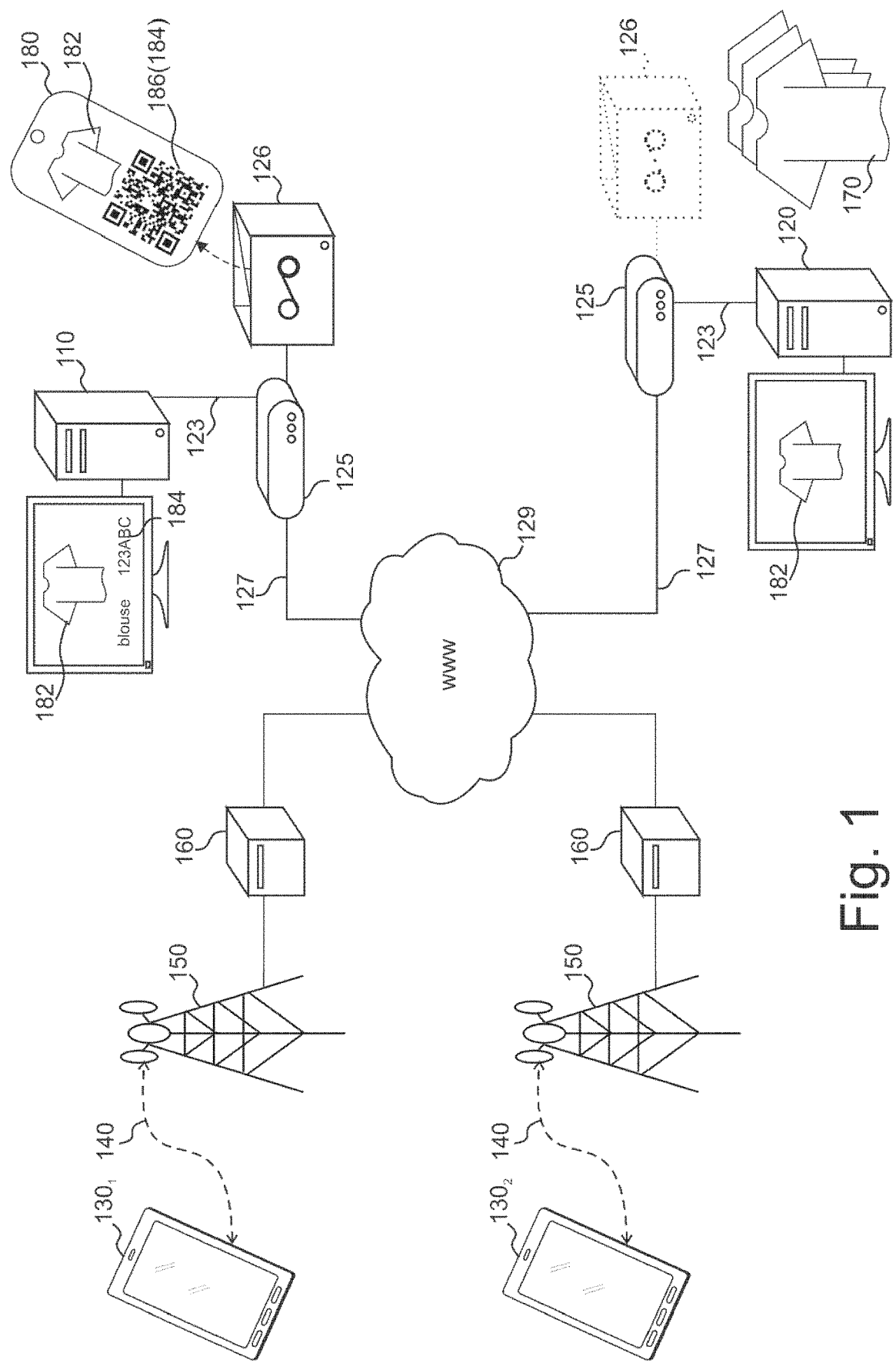
FIG. 1 illustrates a networked environment with a plurality of data processing devices comprising a server device, an item provider terminal and item consumer devices, in which the present invention may be embodied as a system implementing a method of recording multimodal user interaction with items in real and digital environments.
Figure 2:
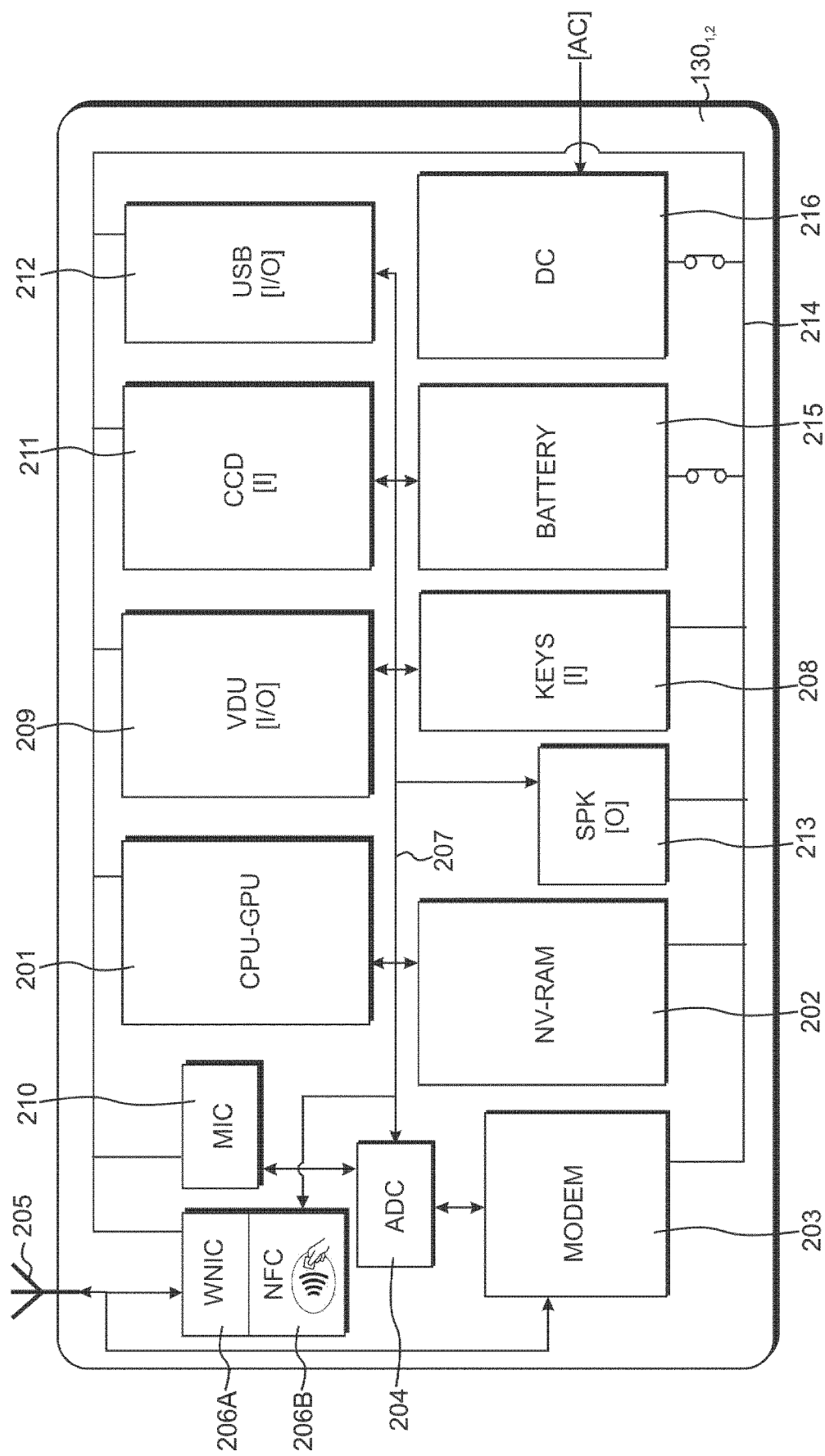
FIG. 2 shows a bloc diagram of an item provider and/or consumer device in the environment of FIG. 1, including a memory, a processor and networking means.
Figure 3:
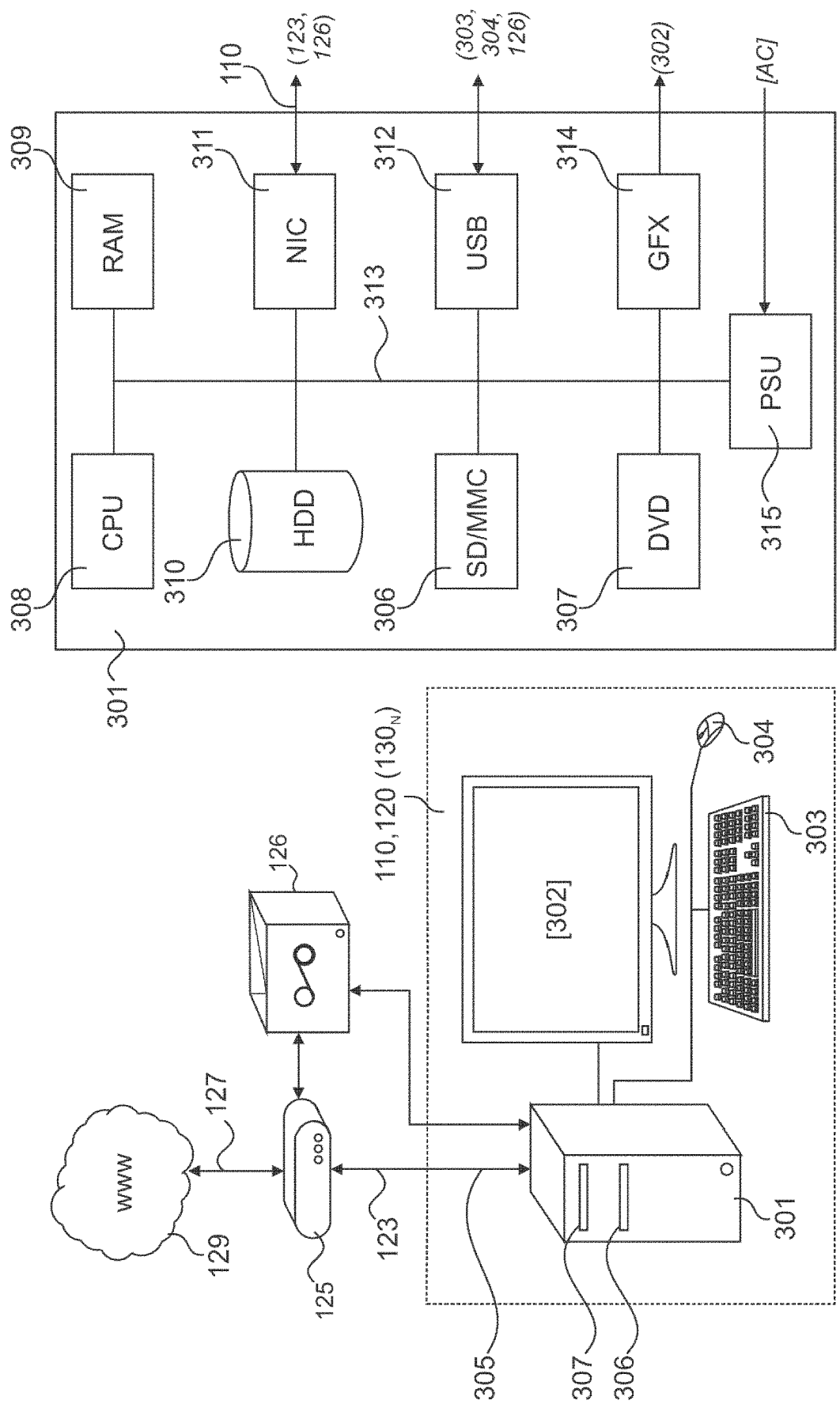
FIG. 3 shows a bloc diagram of the server device in the environment of FIG. 1, including a memory, a processor and networking means.
Figure 4:
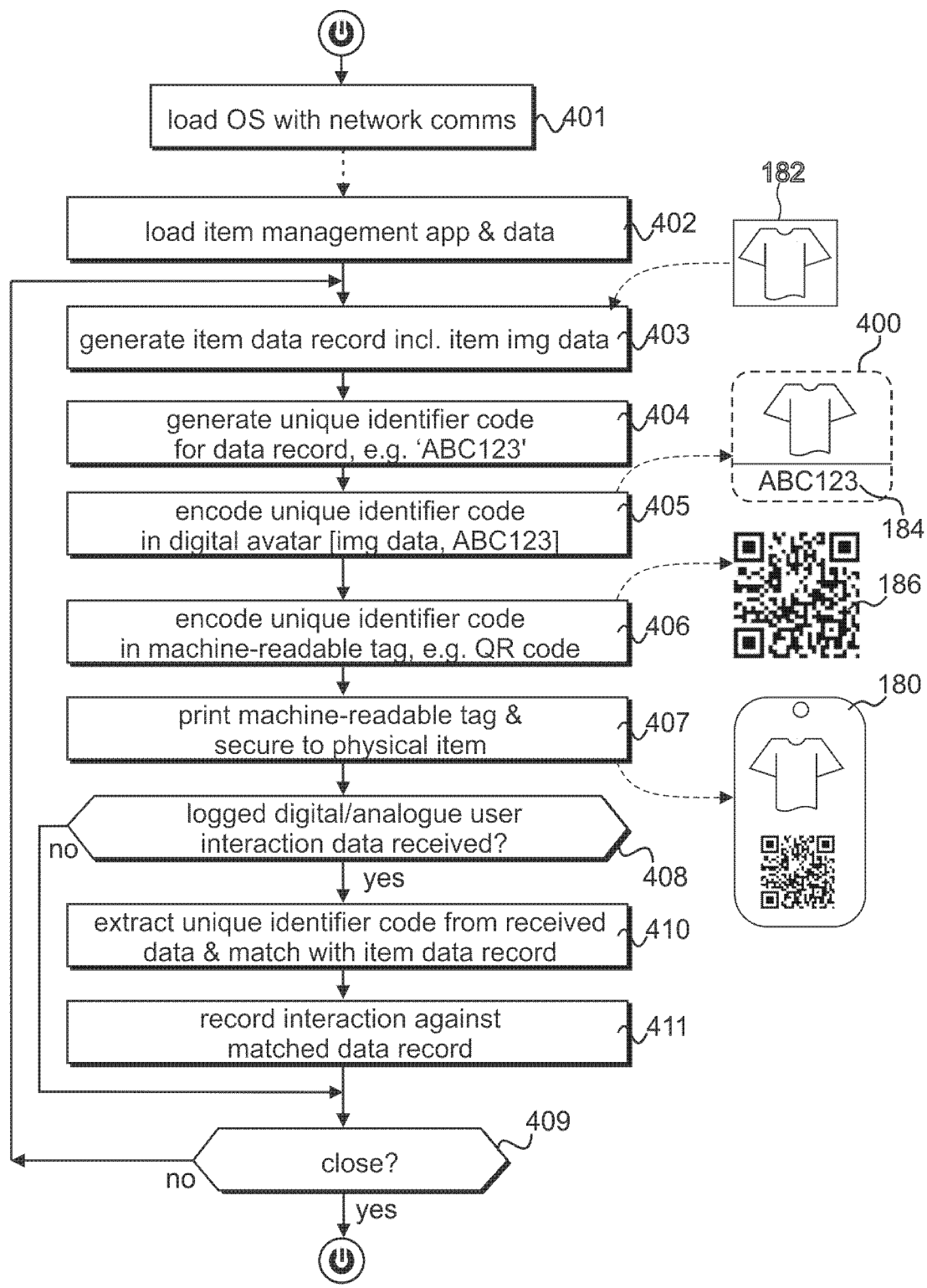
Figure 5:
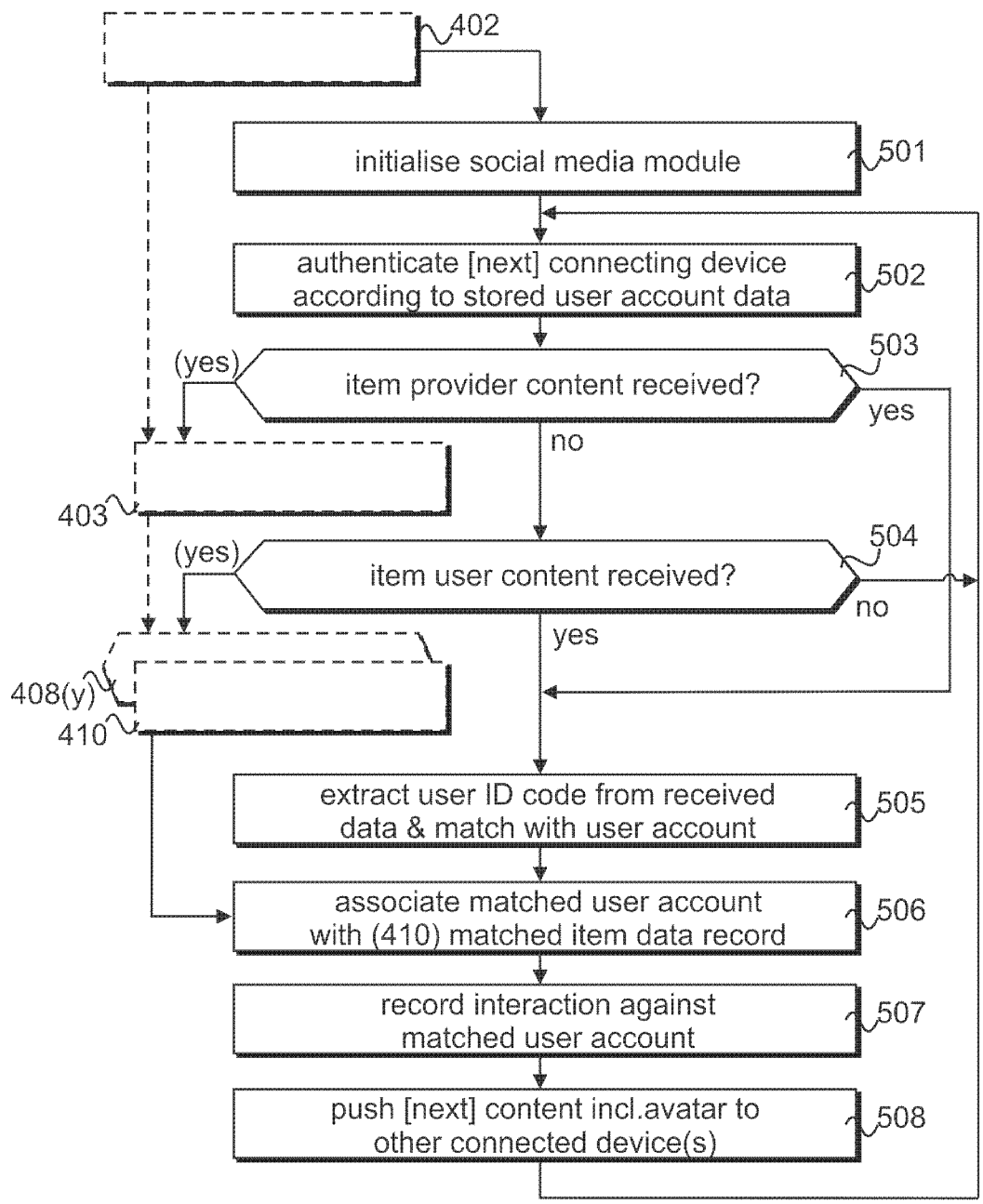
Figure 6:
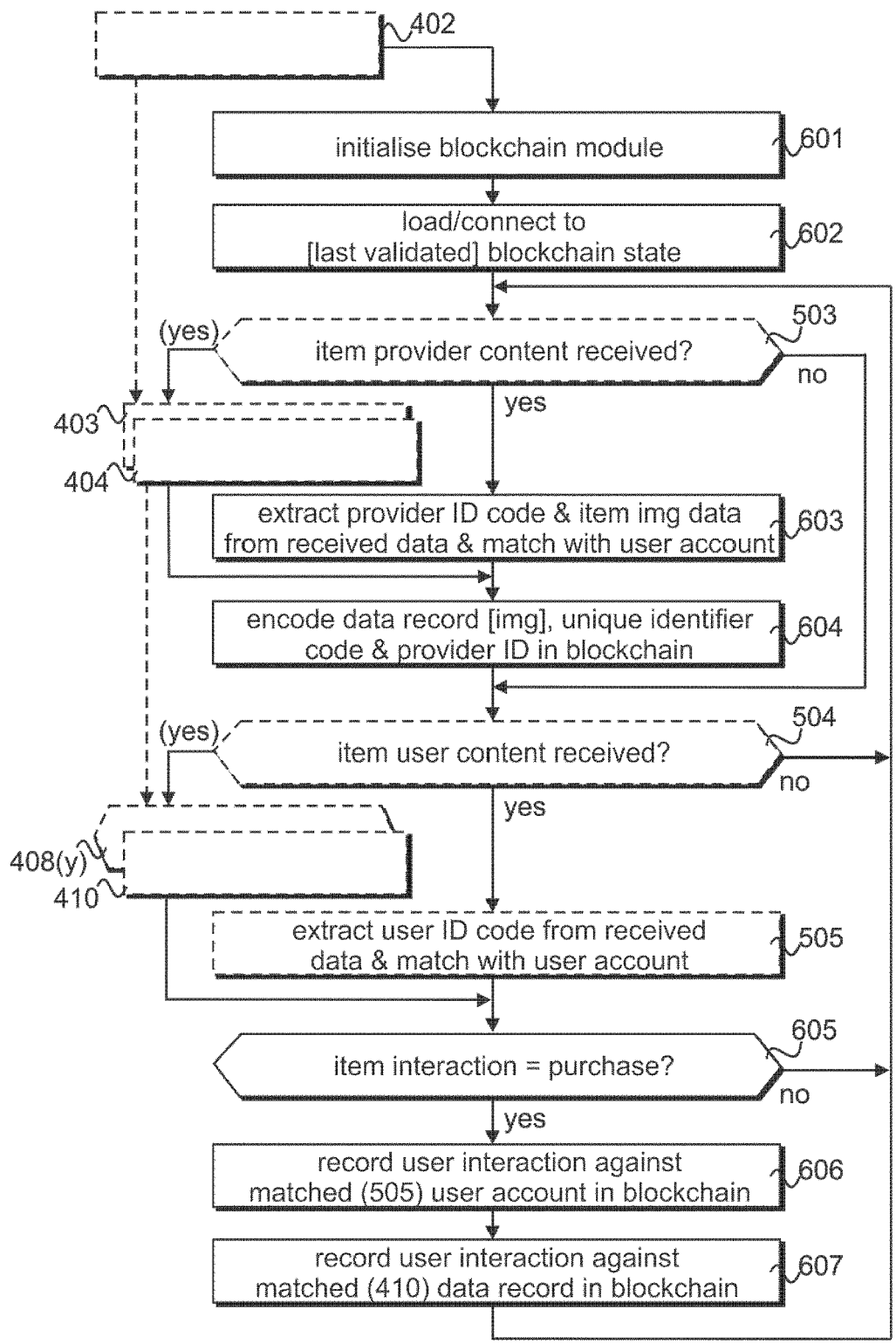
Figure 7:
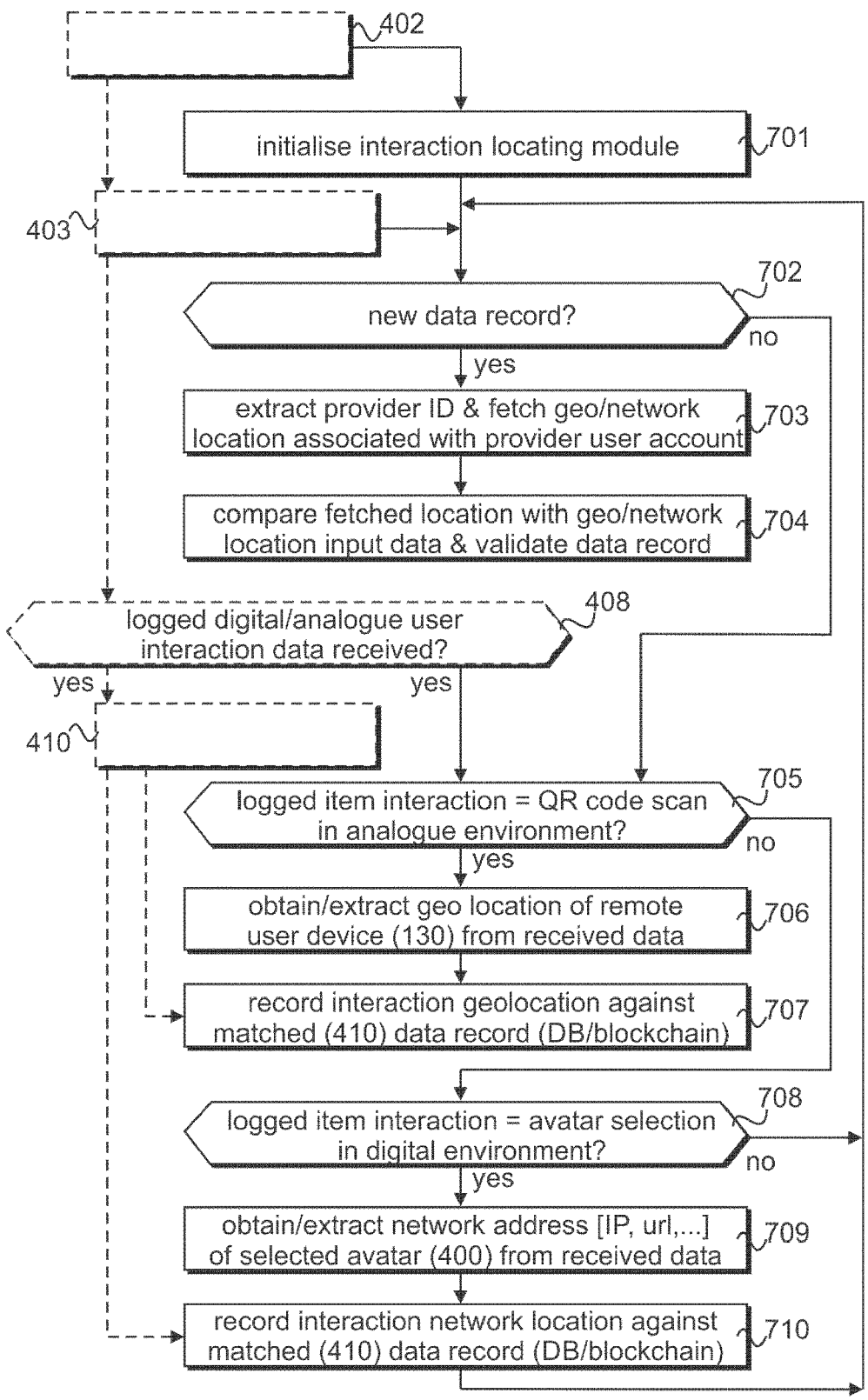
Figure 8:
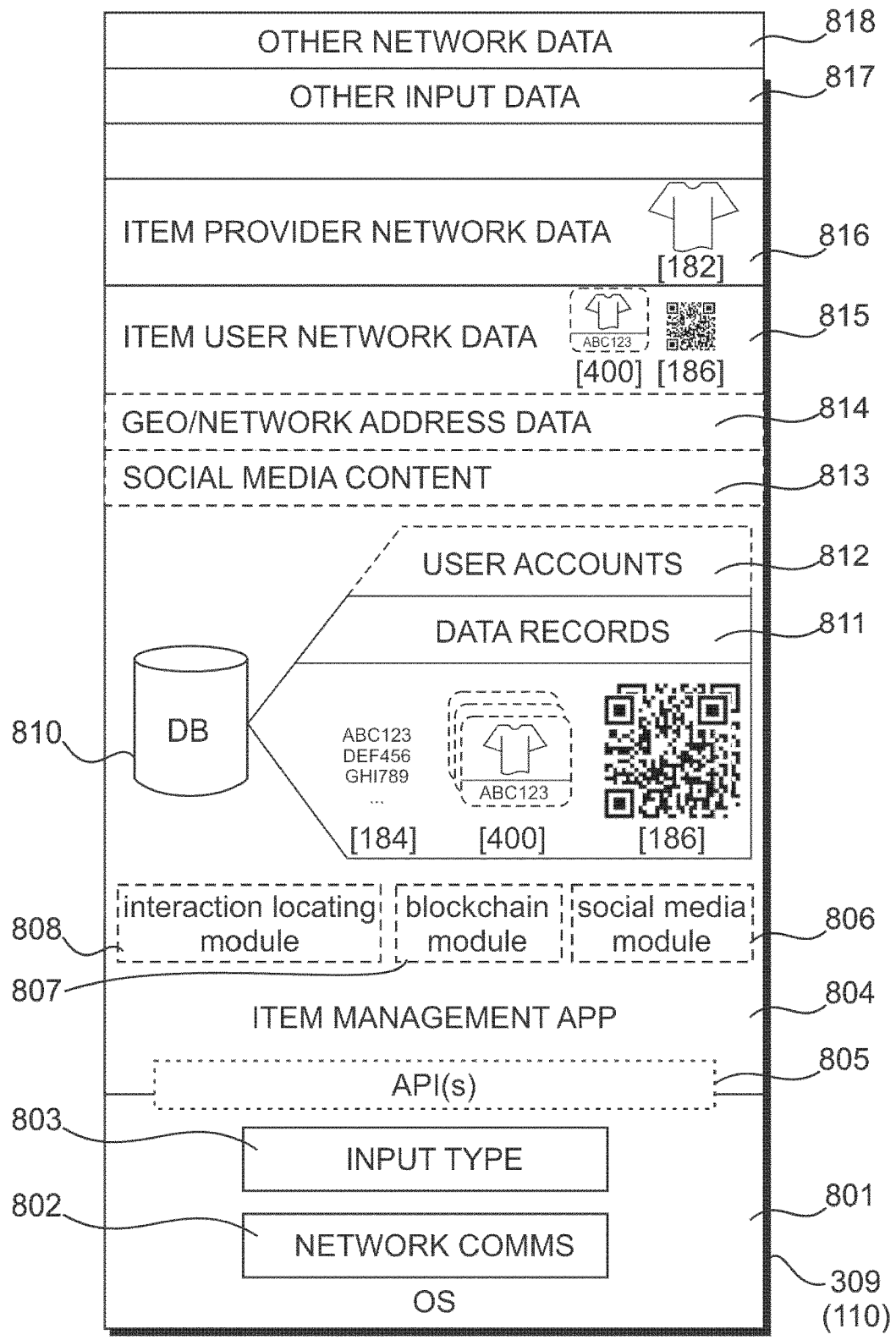
Figure 9:
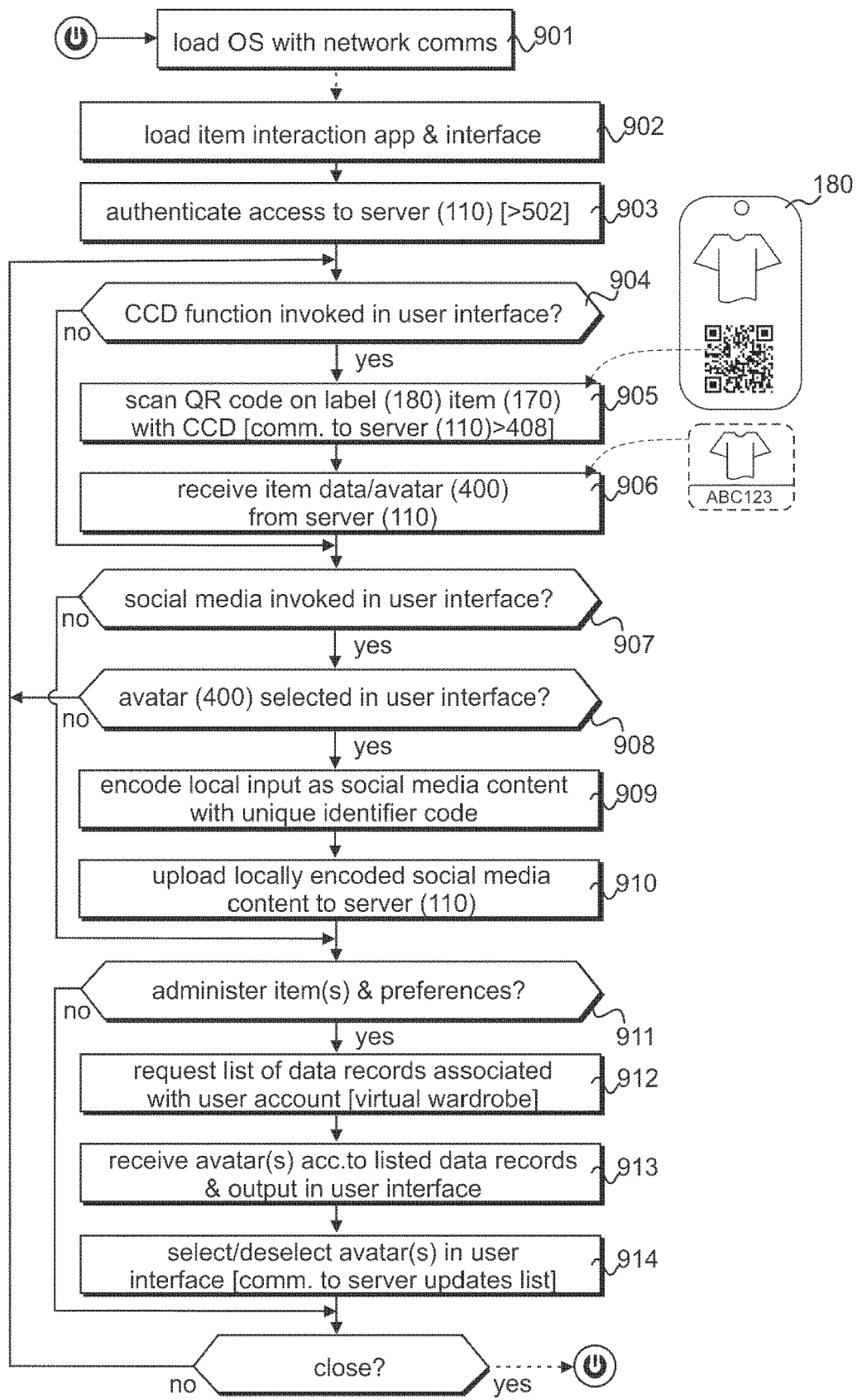
Figure 10:
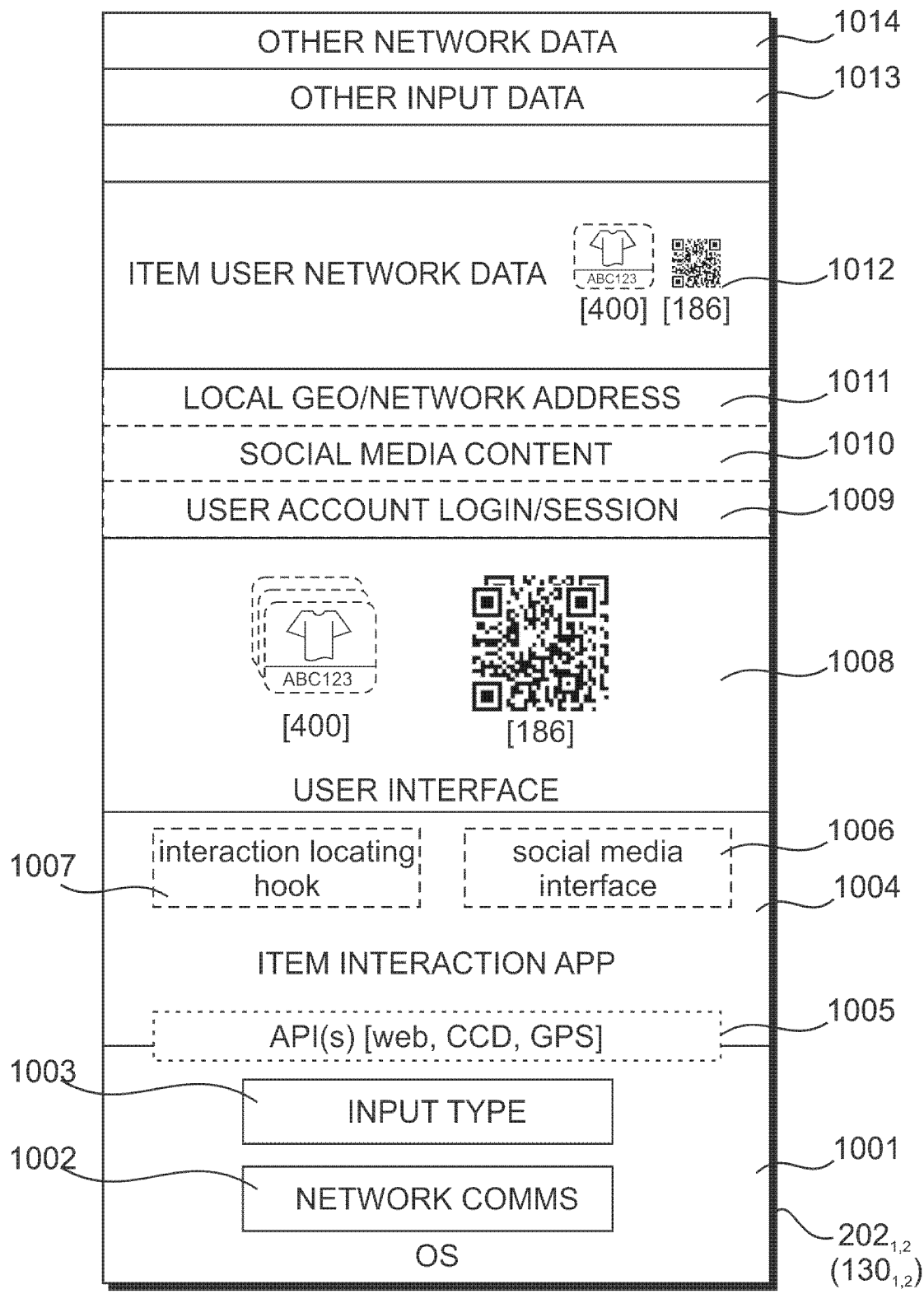
Figure 11:
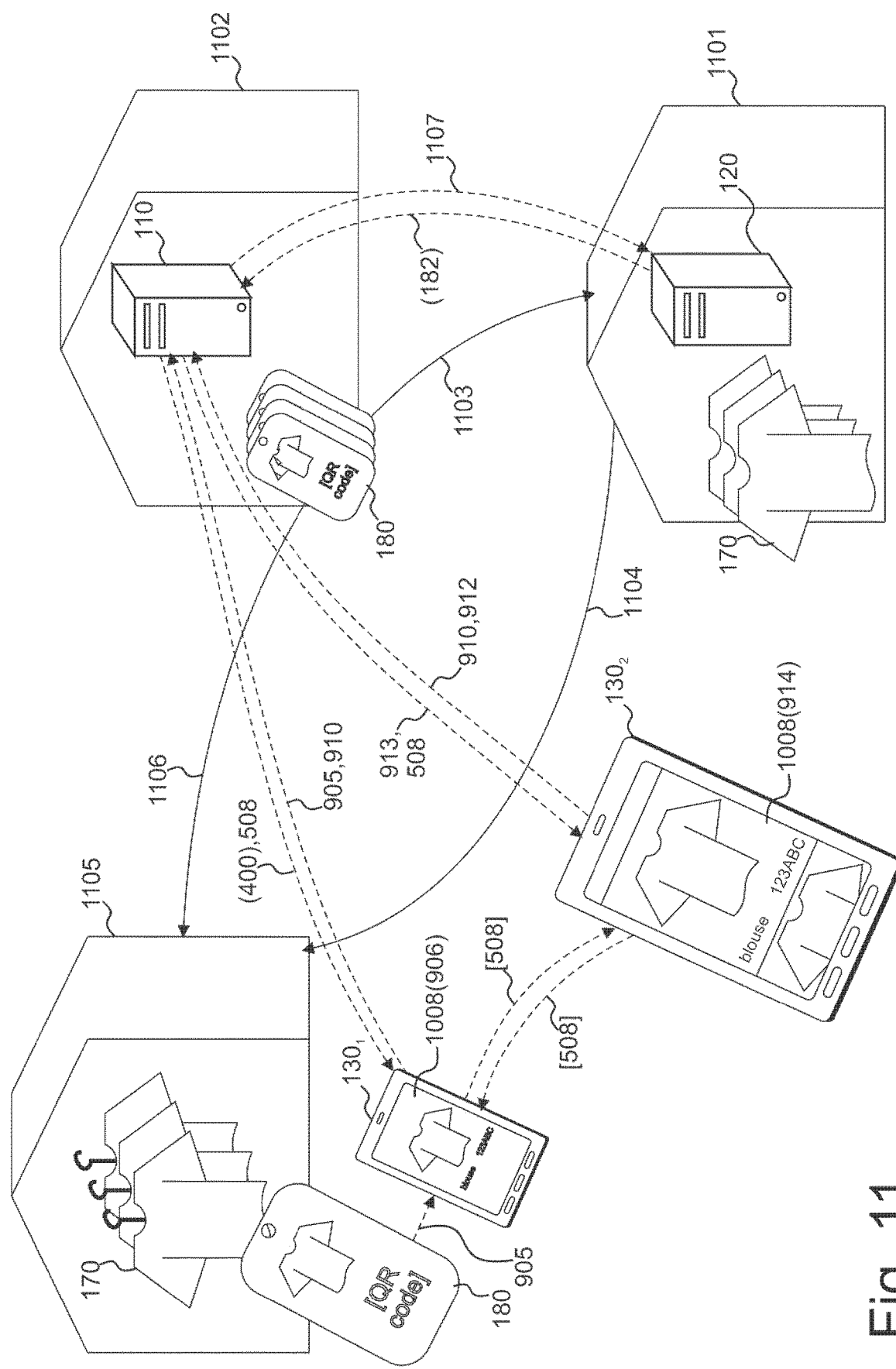
Figure 12:
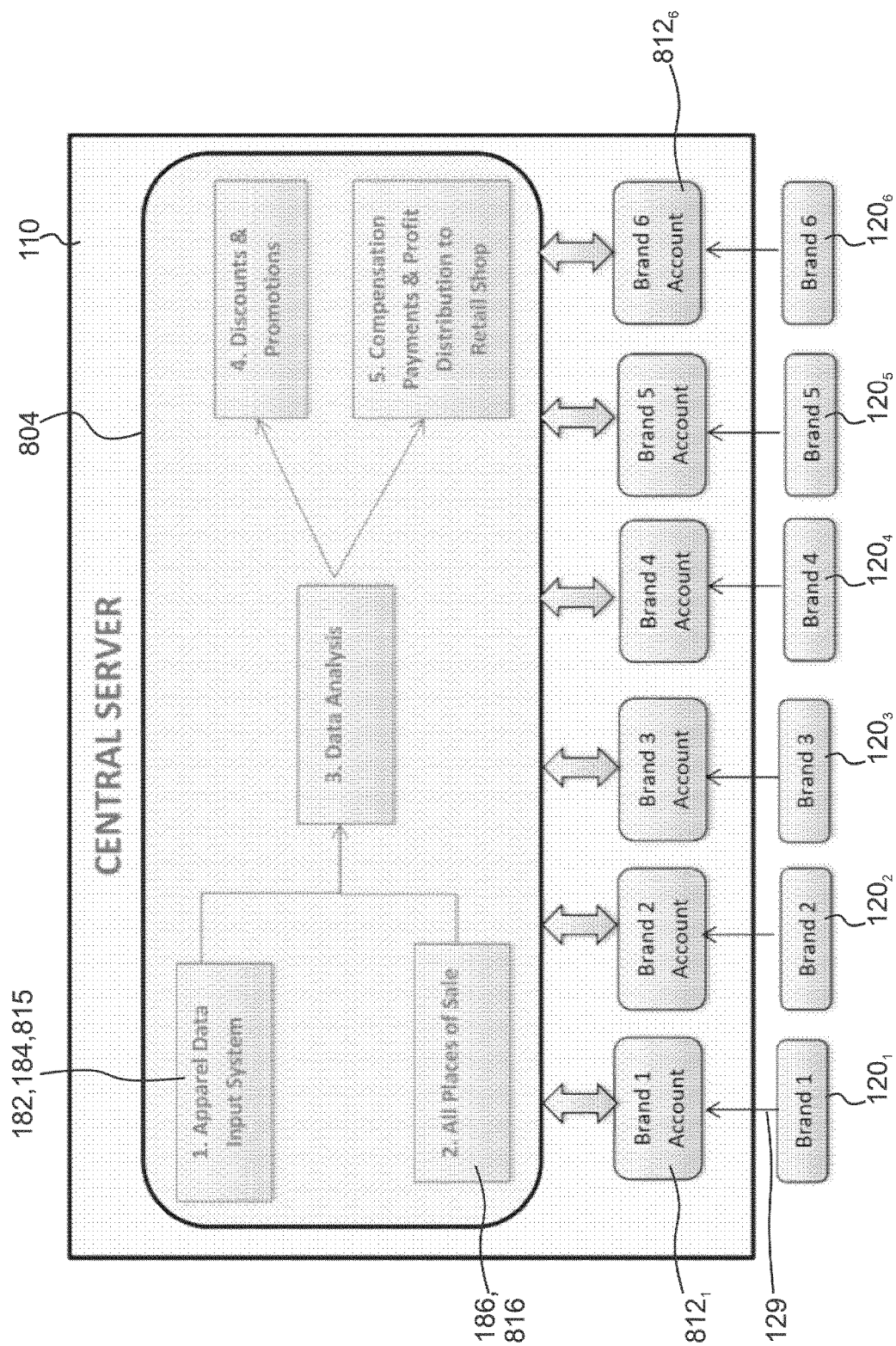

FIG. 4 details steps of a main logic performed at the server device shown in FIGS. 1 and 3 for recording multimodal user interaction with items in real and digital environments, within the environment of FIG. 1, in a first embodiment of a method according to the invention;

FIG. 5 details steps of a main logic performed at the server device shown in FIGS. 1 and 3 for recording multimodal user interaction with items in real and digital environments, within the environment of FIG. 1, in a second embodiment of a method according to the invention;

FIG. 6 details steps of a main logic performed at the server device shown in FIGS. 1 and 3 for recording multimodal user interaction with items in real and digital environments, within the environment of FIG. 1, in a third embodiment of a method according to the invention;

FIG. 7 details steps of a main logic performed at the server device shown in FIGS. 1 and 3 for recording multimodal user interaction with items in real and digital environments, within the environment of FIG. 1, in a fourth embodiment of a method according to the invention;

FIG. 8 represents the contents of the memory of FIG. 3 at runtime, including an operating system, a set of instructions, and discrete data structures thereof according to the embodiment of the method shown in FIG. 4, 5, 6 or 7;

FIG. 9 details steps of a main logic performed at each item consumer device shown in FIGS. 1 and 2 for recording multimodal user interaction with items in real and digital environments according to the embodiment of the method of FIG. 4, 5, 6 or 7;

FIG. 10 represents the contents of the memory of FIG. 2 at runtime, including an operating system, a set of instructions and discrete data structures thereof according to the embodiment of the method of FIG. 9;

FIG. 11 illustrates data flows between the plurality of data processing devices of FIGS. 2 and 3 in the networked environment of FIG. 1 according to the embodiment of the method shown in FIGS. 4 to 10;

FIG. 12 shows an embodiment of a computer platform according to the invention, including a flowchart depicting interaction between the server device and one or more item provider terminals, data that may be stored at the server device and analyses which the server device may perform thereon.

Figure 13:
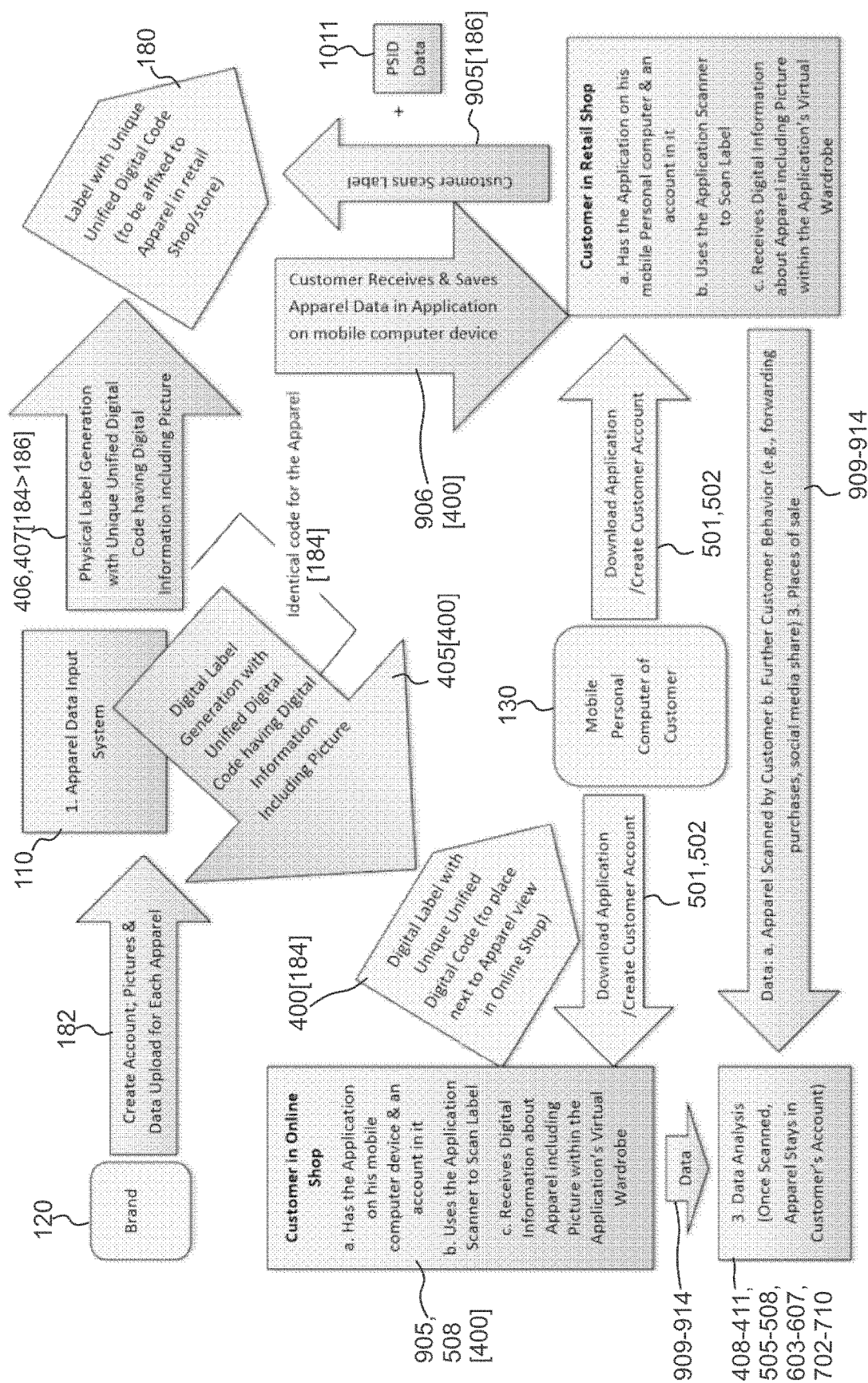

FIG. 13 details step of a method for access, management and retail of items with the computer platform of FIG. 12 using a unified digital code.

Figure 14:
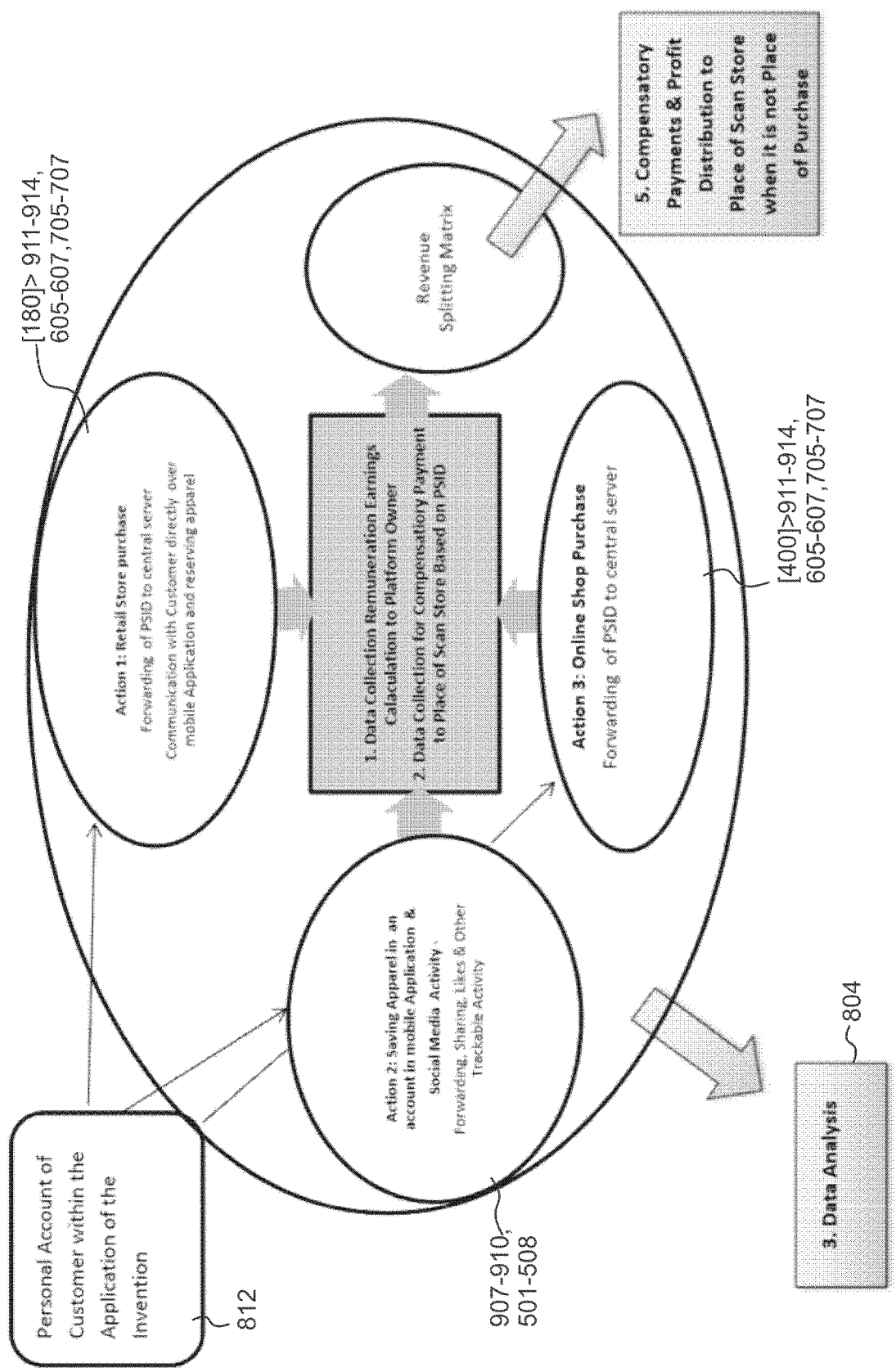

FIG. 14 details steps performed at each item consumer device connected with the computer platform of FIG. 12 and the subsequent data collection for distribution amongst the one or more item provider terminals and the computer platform.

Figure 15:
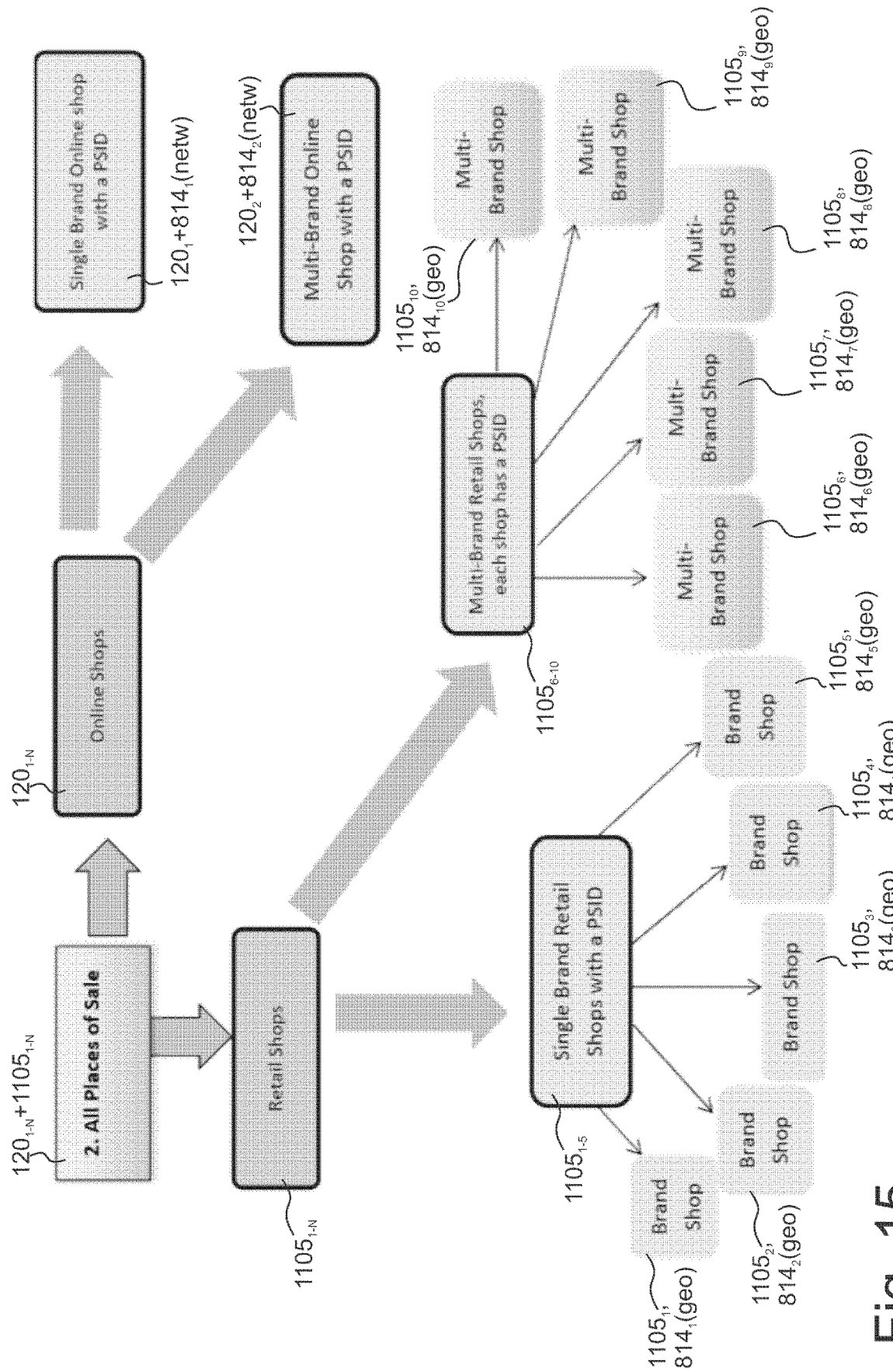

FIG. 15 depicts a flow chart of physical locations which may store items to which a machine readable tag of the invention, comprising the unique unified digital code of FIG. 13, is secured.

Figure 16:
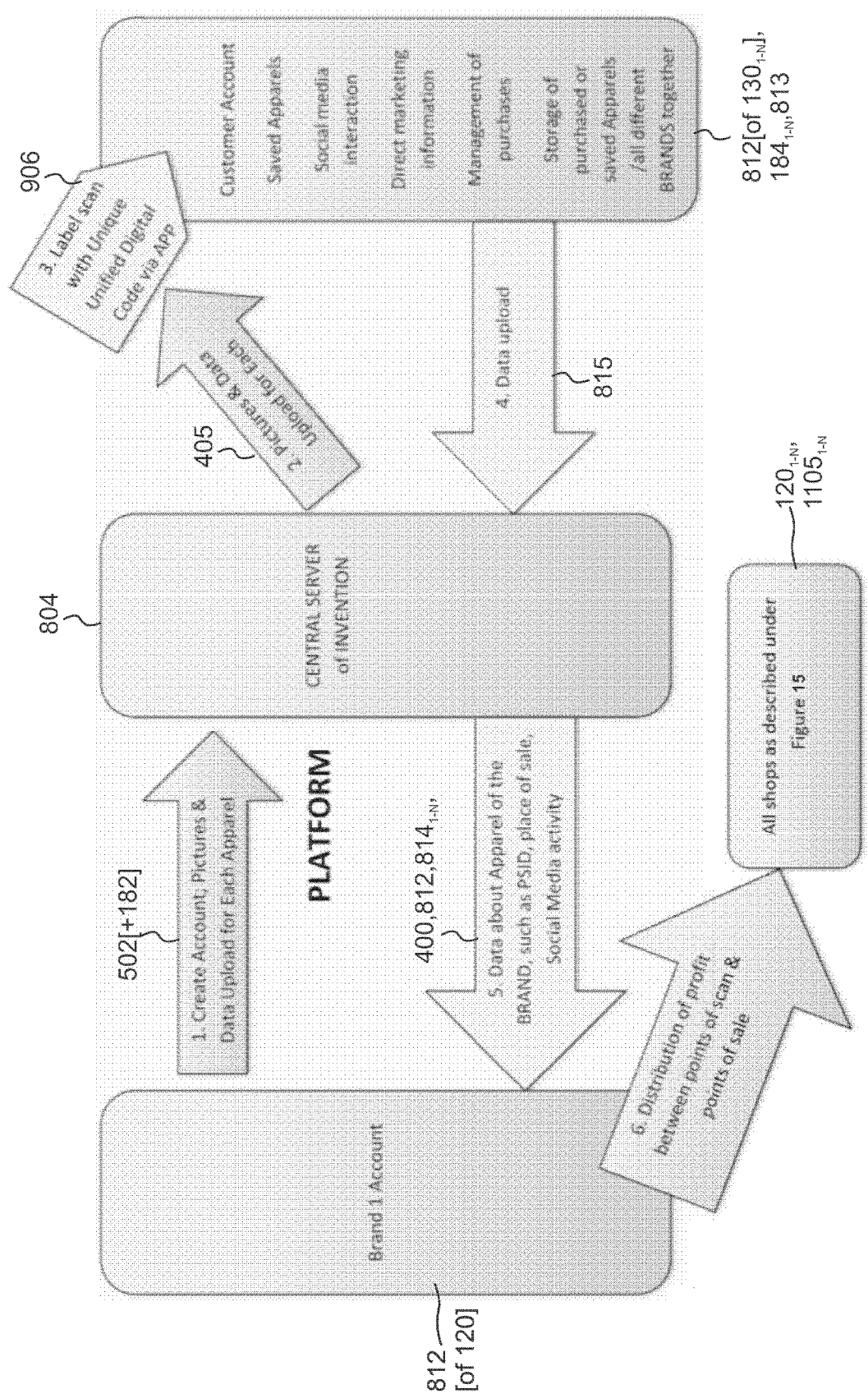

FIG. 16 depicts a flow chart of interactions between item providers, the computer platform and item users' accounts.

DETAILED DESCRIPTION

The following description describes embodiments with clothing by way of example items as, having a short seasonal window of selectivity, they are an appropriate type of physical goods which answer a human necessity, but which generate a high degree of redundant inventory and transport operations through consumer returns. Accordingly it will be easily understood by the skilled person that the principles disclosed and described herein extend to many further and wholly-unrelated types of goods and physically-deliverable services.

Referring now to the figures and initially FIGS. 1 to 3, there is shown a networked environment with a plurality of data-processing devices comprising a server device 110, an item provider device 120 operated by a manufacturer of blouse garments 170, and two item user devices $130_{1,2}$. Herein, an "item provider" should be understood as a manufacturer, retailer and/or other type of purveyor of items as defined herein; and an "item user" should be understood as a potential or actual customer of an item provider with an interest in selecting their item(s) for purchase.

The environment of the example is deliberately small, to avoid obscuring the present description unnecessarily, and the skilled person will easily understand from the foregoing, how a system according to the invention may scale up the operating principles described herein to tens or more of service devices $110_N$, hundreds or more of item provider devices $120_N$ and millions or more of item user devices $130_{1-N}$.

The server device 110 is operated by a party independent of the item providers and item users and, in this example, the item provider device 120 is operated by a clothing manufacturer. Each of the server device 110 and the item provider device 120 is a personal computer device which emits and receives data encoded as digital signals over wired and/or wireless data transmissions 123 that are routed by a local router device 125 implementing a wired local network 123 operating according to the IEEE 802.3-2008 Gigabit Ethernet transmission protocol and/or a high-bandwidth wireless local network 123 operating according to the IEEE 802.11 Wi-Fi wireless transmission protocol.

Such wired and/or wireless data transmissions 123 further include data transmissions sent to, and received from, remote item user devices $130_{1,2}$, which can be relayed respectively to or from the server and user provider devices 110, 120 via their respective routers 125, themselves respectively connected to a wide area network ('WAN') 129, an example of which is the Internet 129, via a conventional ADSL or optical fibre connection 127.

The server device 110 is further interfaced with a printing device 126, which in the example includes a wired and/or wireless local area networking capacity, whereby the interfacing is via the local router device 125 and local network 123. The server device 110 is configured to instruct the printing device 126 to print item labels 180, each comprising at least a pictorial representation 182 of the item 170 to which it is secured in use, and a machine-readable tag 186 encoding an item-respective unique identifier code 184 generated by the server 110 according to principles of the invention described in further details hereinafter.

The skilled person will easily understand from the present description, that the item provider terminal 120 may be similarly interfaced with a printing device 126 for the same label-printing purpose as the server 110, wherein the server 110 sends a data file encoding the item label 180 to the item provider terminal 120 across the WAN 129, so that the manufacturer may print labels 180 with the data file and secure the printed labels to blouses at their place of manufacture, to avoid wasting resources shipping printed labels from the location of the server 110.

In the example, the item user devices $130_{1,2}$ are mobile personal communication devices emitting and receiving data, including voice and/or alphanumerical data, encoded as a digital signal over a wireless data transmission 140, wherein the signal is relayed respectively to or from each device $130_{1,2}$ by the geographically-closest communication link relay 150 of a plurality thereof. The plurality of communication link relays $150_N$ allows digital signals to be routed between mobile devices $130_{1,2}$ and their intended recipient by means of a remote gateway 160. Gateway 160 is for instance a communication network switch, which couples digital signal traffic between wireless telecommunication networks, such as the telecommunication network within which wireless data transmissions 140 take place, and other intermediary networks bridging protocol and distance between communicating nodes, such as public switched telephone networks ('PSTN') and Wide Area Neworks ('WAN') generally denoted by the same reference 129.

Network connectivity and interoperable networking protocols of each device 110, 120, $130_{1,2}$ in the environment allow the devices to connect to one another and communicate data to and receive data from one another according to the methodology described herein and, in that context, each gateway 160 provides relevant protocol conversion as required, for instance if an item user device $130_N$ uses a legacy Mobile Application Part ('MAP') or Wireless Application Protocol ('WAP') signalling capability and/or mobile IPv6 applications with Diameter Authentication, Authorization and Accounting ('AAA') SS7 transactional capabilities.

A typical hardware architecture of an item user device 130 is next described in further detail with reference to FIG. 2, by way of non-limitative example. As skilled persons will readily understand, the substantially common hardware architecture of the user mobile devices $130_{1,2}$ is designed for purposes of ergonomic handling and miniaturisation to improve portability. Skilled persons should also readily understand however, that the principles described herein in association with the server device 110 may be extended without difficulty to any alternative form of network-connectable data processing terminal, such as a personal computer having an architecture substantially similar to that of the server device 110 or the item provider device 120 and described with reference to FIG. 3 hereafter.

The mobile device 130 thus firstly includes a data processing unit 201, for instance a general-purpose microprocessor, for instance conforming to the Cortex™ architecture manufactured by ARM™, acting as the main controller of the mobile device 130 and which is coupled with memory means 202, comprising volatile random-access memory (RAM), non-volatile random-access memory (NVRAM) or a combination thereof.

The mobile device 130 further includes networking means. Communication functionality is provided by a modem 203, which provides the interface to external communication systems, such as the GPRS, 3G, 4G/LTE or 5G cellular telephone network 150, 160, 170 shown in FIG. 1, associated with or containing an analogue-to-digital converter 204, which receives an analogue waveform signal through an aerial 205 from the communication link relay 150 and processes same into digital data with the data processing unit 201 or a dedicated signal processing unit. Alternative wireless communication functionality is provided by a wireless network interface card (WNIC) 206A, apt to interface the mobile device 130 with a wireless local area network generated by a local wireless router (not shown). Further alternative wireless communication functionality may be provided by a High Frequency Radio Frequency Identification (RFID) networking interface 206B implementing Near Field Communication (NFC) interoperability and data communication protocols for facilitating wireless data communication over a short distance with correspondingly-equipped devices.

The CPU 201, NVRAM 202 and networking means 203 to 206B are connected by a data input/output bus 207, over which they communicate and to which further components of each item user device 130 are similarly connected, in order to provide wireless communication functionality and receive user interrupts, inputs and configuration data. Accordingly, user input may be received from a data input interface 208, which for the mobile device 130 is a keypad with a limited number of multi-functional keys and/or a capacitive or resistive touch screen feature of the display unit 209. Further input data may be received as analogue sound wave data by a microphone 210, digital image data by a digital camera lens (CCD) 211, digital data via a Universal Serial Bus (USB) 212, and geographical positioning satellite signals by a Global Positioning System ('GPS') module interfaced with the aerial 205. Processed data is output as one or both of display data output to the display unit 209 and audio data output to a speaker unit 213. Power is supplied to the above components by the electrical circuit 214 of each network node, which is interfaced with an internal battery module 215, wherein the battery is periodically recharged on an ad hoc basis by an electrical converter 216.

A typical hardware architecture of the server data processing terminal 110 and the clothing manufacturer data processing terminal 120 is next described in further detail with reference to FIG. 3, by way of non-limitative example. As skilled persons will readily understand, the hardware architecture of these computers 110, 120 may be substantially identical or similar to one another, with components designed for durability and redundancy of operation.

Each data processing terminal 110, 130 is a computer configured with a data processing unit 301, data outputting means such as a video display unit (VDU) 302 and the digital printer device 126, data inputting means such as HiD devices, commonly a keyboard 303 and a pointing device (mouse) 304, as well as the VDU 302 itself if it is a touch screen display, network data inputting/outputting means such as the wired or wireless network connection 133 to the communication network 170 via the router 135, a magnetic data-carrying medium reader/writer 306 and an optical data-carrying medium reader/writer 307.

Within each data processing unit 301, a central processing unit (CPU) 308 provides task co-ordination and data processing functionality. Sets of instructions and data for the CPU 308 are stored in memory means 309 and a hard disk storage unit 310 facilitates non-volatile storage of the instructions and the data. A wireless network interface card (NIC) 311 provides the interface to the network connection 133. A universal serial bus (USB) input/output interface 312 facilitates connection to the keyboard and pointing devices 303, 304. Conventionally, the digital printer device 126 may be connected to the server device 126 either through a direct interface such as the USB interface 312, or through a network interface such as the NIC interface 311.

All of components of the data processing unit 301 are connected to a data input/output bus 313, to which the magnetic data-carrying medium reader/writer 306 and optical data-carrying medium reader/writer 307 are also connected. A video adapter 314 receives CPU instructions over the bus 313 for outputting processed data to VDU 302. All the components of data processing unit 301 are powered by a power supply unit 315, which receives electrical power from a local mains power source and transforms same according to component ratings and requirements.

Within the context of the system shown in and described with reference to FIGS. 1 to 3, the methodology of the invention is implemented as a data processing logic processed at the server 110 and each item user device $130_{1-N}$ for recording multimodal user interaction with items, such as the blouse 170 of the example, in both real and digital environments A main logic performed at the server device 110 for recording multimodal user interaction with items in real and digital environments, in a first embodiment of a method according to the invention, is now described with reference to FIG. 4. Data processing steps of the methodology are described as a discrete group of chronological data processing tasks repeated iteratively at runtime. It will be readily understood by the skilled person that such steps may be optimised and, where appropriate, processed substantially in parallel, as the architecture of the CPU 301, and the basic instructions set and libraries for same allows.

After powering up the server device 110 conventionally, an operating system ('OS) is loaded into the data processing unit memory 309 and started locally at step 401, including communications subroutines of the OS and its user interface is eventually instantiated on the display 302.

An item management application is next loaded into the data processing unit memory 309 and started locally at step 402, which configures the server to initially generate and store a data record for a physical and/or digital item 170 at step 403. The data record comprises data representative of the item, and may be generated either locally, or from item data uploaded to the server 110 by an item provider device 120, or a combination thereof. A core aspect of the inventive principles disclosed herein, is that the data representative of the item should always include at least image data 182 depicting the item 170 for which the data record is generated at step 403.

The image data 182 may be one or more digital photograph(s) of the item, or one or more computer-rendered image(s) depicting the item, or a three-dimensional data structure having surface-respective texture(s) associated therewith likewise depicting the item, or even a four-dimensional data structure depicting the item in a sequence.

Preferably however, the representative data includes further details about the item, such as a manufacturing origin and item characteristics such as, with reference to the blouse 170 of the example, a brand, reference size, colour, dimensions, material of manufacture and manufacturer and/or retailer part number.

At a next step 404, the item management application generates a code, interchangeably referred to herein as a unique unified code or the unique identifier code 184, that is respective and unique to the data record generated at the previous step 403, and which may be any type of machine-readable expression, such as an alphanumerical ASCII sequence at its simplest, for example 'ABC123' in the example shown in the Figures.

The item management application associates the generated unique identifier code 184 with the data record. At step 405, the item management application encodes at least the unique identifier code 184 and the image data 182 into a digital avatar 400 of the item corresponding to the data record generated at the previous step 403, which the server device 110 may distribute on demand to connected item user devices $130_{1,2}$ and other connected devices across the WAN 129 in the networked environment of FIG. 1. Other connected devices, in context, may comprise any data processing terminal connected to the WAN 127 processing a browser, social media and/or electronic store application capable of receiving, processing and rendering an avatar 400 of the invention in a user interface.

At a next step 406, the item management application encodes the unique identifier code 184 generated at the previous step 404 into a machine-readable tag 186, for example a matrix barcode such as a well-known Quick Response ('QR') code. Alternative embodiments consider encoding one or more further data structures or codes into the machine-readable tag 186 beyond the unique identifier code 184, which should however remain individually and distinctly readable in a data processing context. Such further data structures or codes may for example include a geographical location of the item provider or of a specific store at which the item is physically retailed, a network location of the item provider's website or of a specific online store at which the item is virtually retailed.

The item management application then outputs one or more physical item tag(s) or label(s) 180 recoding the machine-readable tag 186, in the example the application instructs the connected printer 126 to output QR codes on paper or card label(s) 180. Electronic alternatives to an inert substrate like paper or card are considered by way of the physical item tag 180, such as physical Near Field Communication ('NFC') and RFID devices, whereby the unique identifier code 184 may be encoded as a radio-transmittable data tag 186, rather than an optically-recognisable data tag 186. The tag or label 180 may then be secured to each physical embodiment of the item outside the networked system, i.e. each blouse 170 manufactured by or for the operator of item provider device 120, at step 407.

Each physical tag or label 180 should always include the machine-readable tag 186, and preferably also include the image data 182 corresponding to the item 170 for which the data record is generated at step 403. Since the physical label 180 contains the machine-readable tag 186 encoding an item's unique identifier code 184 generated by the server 110 independently of the item manufacturer, and since the machine-readable tag 186 is secured with the label 180 to the real item 170 that is manufactured to a respective design, there is full correspondence between the image data 182 uniquely associated with the unique identifier code 184 and the appearance of the real item 170.

Accordingly the machine-readable tag 186 effectively acts as a second factor of item authentication for a purchasing consumer, wherein an item can be verified as genuine independently of the item manufacturer and the place of retail, by scanning the machine-readable tag 186 with the item user device 130, polling the server 110 with the scanned data and receiving the avatar 400 inclusive of the image data 182 from the server 110 in reply, the received image data 182 corresponding to the visual appearance of the item 170. This aspect is further enhanced by adding the image data 182 corresponding to the item 170 on the label 180, for providing a triple-factor comparison, the received image data 182 corresponding to the visual appearance of the item 170 and identically to the image data 182 recorded on the label 180.

In order to record the interaction of users with items in both the digital environment shown in FIG. 1 and the analogue environment outside of it in which physical embodiments of items exist, the item management application at the server 110 relies upon receiving logged interaction data from user devices $130_{1,2}$ over the network 129, wherein such logged interaction data is generated by users interacting with their respective item user device 130 according to a methodology described hereinbelow with reference to FIG. 9. In preliminary terms, item users log interaction data whenever they interact with either avatars 400, i.e. digital versions of physical items, that they have received over the network according to step 405, and/or with analogue items 170, typically in physical retail environments, by reading the machine-readable tag 180 secured to the item according to step 406.

Accordingly, a question is asked at step 408, about whether the item management application has received user interaction data from a remote user device $130_{1\text{-}N}$. When the question is answered negatively, the logic proceeds to a next question 409 about whether the item management application should be closed. When the question of step 409 is answered positively, the item management application is unloaded from the memory 409, conversely when the question of step 409 is answered negatively, the logic returns to step 403, wherein a next data record may be generated for a next item, and so on and so forth.

Alternatively, when the earlier question of step 408 is answered positively, the received user interaction data invariably includes either a unique identifier code 184 from the avatar 400 interacted with digitally at the remote item user device 130, or a unique identifier code 184 read from the machine-readable tag 186 on the item label 180 at the remote item user device 130, wherein the item management application extracts the unique identifier code 184 from the received data and matches the extracted code with the corresponding item data record stored at the server device 110 at step 410. The item management application then records the received interaction against the matched data record at the next step 411, preferably with a data input representative of one or more of the interaction context, i.e. digital or analogue, and/or of the interaction type, e.g. analogue tag scan or item selection, and/or of the interaction purpose, e.g. digital item bookmarking or physical item purchase. The logic then returns to step 403, wherein a next data record may be generated for a next item, and so on and so forth.

Steps 403 to 408 as described herein define a simple embodiment of the methodology according to the invention, for the skilled person to appreciate the basic technical principle of bridging the co-existing virtual and physical contexts in both of which an item, such as the blouse 170 of the example, may be embodied, with a unique and common referential having respective digital and physical expressions, for capturing and recording user interaction across with that same item in both contexts irrespective, both seamlessly and substantially in real-time. Further embodiments of the methodology according to the invention are considered hereinafter, of varying further complexity and exhibiting further technical advantages, with implementing data processing steps described with reference to FIGS. 5, 6 and 7.

With reference to FIG. 5, an embodiment of the method considers generating and storing a user account for each operator of an item provider device 120 and each user of an item user device $130_{1,2}$, preliminarily to generating data records of step 403 and network-broadcasting avatars at step 405, in order to secure connections for bilateral data communications, to provide and qualify permissions for such data communications, and to personalise records of interaction. Data processing steps of the previously-described embodiment are shown in dotted lines in Figure to illustrate its compatibility with this embodiment.

A social media module of the item management application is provided in this embodiment, which is started at a step 501 after the application loading of step 402 for providing each client device, inclusive of user provider devices 130 and item user devices $130_{1\text{-}N}$, with an electronic bilateral messaging interface to the server 110 and all other client devices in the networked system, allowing each client device to message one or more remote client devices in the networked system of FIG. 1 through that interface.

Several distinct types of user accounts can be implemented for operators of item provider devices 120, according to their respective role within the lifecycle of an item, for example to distinguish between item designers, item manufacturers, item importers, item retailers and more, which is useful when some or all of these entities are corporate bodies distinct from each other. Item provider user accounts, particularly manufacturers or item brand owners (when these are distinct corporate bodies) may usefully be provided with exclusive permission to upload item data including image data 182, in order to enhance authenticity of the data in the data record, so as to mitigate against counterfeit items. Further types of specialist user accounts are also considered, for instance for item referrers, colloquially referred to as online 'influencers' and apt to recommend items through the social media module, and/or for third party data suppliers, an example of which is aggregators of physical retail estate data (stores locations, recorded footfalls, stockholding, etc.), which may inherit some or all of the attributes of item provider user accounts.

At step 502, the access of a first client device 120, 130 connecting to the server 110 is authenticated by the social media module according to a respective user account stored at the server 110 in order to establish a secure data communicating session. A first question is then asked at step 503, about whether item provider content data has been received from a connected provider device 120, such as item data inclusive of item image data. When the question of step 503 is answered negatively, a next question is then asked at step 504, about whether item user content data has been received from a connected item user device 130, such as a scanned unique identifier code or an avatar selection.

In this respect, a parameterising option of the session may be that, save as to content data corresponding to new item data for generating a new data record at step 403, each content data message generated at a client device always includes at least one unique identifier, associating at least one logged user interaction with the network message; and that connected client devices are prevented by the social media module from uploading content data messages to the server 100 unless this condition is met.

When the question of step 504 is answered negatively, the logic returns to step 502, at which the access of a next client device 120, 130 connecting to the server 110 may be authenticated, and so on and so forth. Alternatively, when the question of step 503 is answered positively, the social media module forwards the received item provider content data to step 403 for the generation of a new data record, and thereafter of a new and respective unique identifier code. Likewise, when the question of step 504 is answered positively, the social media module forwards the received item user content data to the question of step 408 for determining whether the content data is a logged user interaction. In both instances of positive answers, and in parallel, the social media module next extracts the user identifier from the network message containing the received content data and matches the extracted user identifier with the stored, respective user account at step 505.

At the next step 506, the user account matched at step 505 is associated with the item data record matched in parallel at step 410 and, at step 507, the logged user interaction constituted by the received provider content data or user content data of steps 503, 504 is recorded against the corresponding and matched user account, in a manner analogous to the recording of the logged user interaction against the matched data record account at step 411.

The social media module then publishes the received provider content data to one or more other connected client devices at step 508, in accordance with conventional social media content network broadcasting techniques and with push-pull communication preferences of the said one or more other connected client devices.

With reference to FIG. 6, an embodiment of the method considers recording item data records and logged user interaction in a distributed electronic ledger such as a blockchain data structure, in order to further enhance authenticity of the data in data records and provide an auditable record of user interactions over the lifecycle of an item, including for instance its ownership and any subsequent transferring thereof. As before, data processing steps of the previously-described embodiments are shown in dotted lines in FIG. 6 to illustrate their compatibility with this embodiment.

A blockchain module of the item management application is accordingly provided in this embodiment, which is again started at a step 601 after the application loading of step 402, and either loads the last-validated instance of a relevant blockchain data structure, or establishes a secure network connection through a relevant API across the WAN 129 to a third party host server interfacing with a remote blockchain data structure.

In this embodiment, when the item management application receives provider data from a connected item provider device 120, including image data 182 representative of the item, for creating a new data record and a respective unique identifier code for same, for instance when the question of 503 in the previous embodiment is answered positively whereby the new data record is generated at parallel step 403 and the unique identifier code generated for same at step 404, then at step 603 both an item provider identifier, such as the user account identifier in the previous embodiment, and the image data 182 are extracted from the received item data. At a next step 604, at least the extracted data including the item provider identifier and image data 182, and the unique identifier code generated at step 404, are encoded in the blockchain data structure.

The provider data may usefully include an authentication token or code or similar data structure guaranteeing the manufacturing origin of each physical embodiment of the item for which the data record is created at step 403 and which, in this embodiment, also gets extracted at step 603 and encoded in the blockchain at step 604. Alternatively, with reference to the embodiment described with reference to FIG. 5, the authentication event of step 502 may substitute for the providing of this authentication token or code.

In this embodiment still, when the item management application receives user data from a connected item user device 130, including at least a unique identifier code 184 encoded in a digital avatar 400 or read from an encoded tag 186, for instance when the question of 504 in the previous embodiment is answered positively whereby a user identifier is extracted from the network message containing the received content data at step 505, then a question is next asked at step 605 about whether the logged user interaction in the received user data is representative of a purchasing event, digital or analogue regardless. When the question of step 605 is answered negatively, the logic awaits receipt of (next) provider data from a connected item provider device 120, in order to eventually record same in the blockchain data structure at steps 603, 604.

Alternatively, when the question of step 605 is answered positively, then at step 606 the user identifier (optionally of the user account authenticated by the social module at step 502 when present), the logged purchase event and the unique identifier code are encoded in the blockchain data structure, recording the user's ownership of the purchased item therein. At a next step 607, the data record corresponding to the unique identifier code and the logged purchase event are encoded distinctly in the blockchain data structure, recording the purchasing instance for the specific item anonymously, i.e. independently of any data apt to identify the purchasing user. The logic then again awaits receipt of (next) provider data from a connected item provider device 120, in order to eventually record same in the blockchain data structure at steps 603, 604; or (next) user data from a connected item user device 130, and so on and so forth.

With reference to FIG. 7, an embodiment of the method considers augmenting the data granularity of multimodal user interactions recorded according to the invention, with associating location data that may be geographical and/or digital to the logged analogue and digital interactions, in order to enhance the objective and qualitative character of the auditable record of user interactions over the lifecycle of items. As before, data processing steps of the previously-described embodiments are shown in dotted lines in FIG. 7 to illustrate their compatibility with this embodiment, which is preferably implemented together with user accounts per FIG. 5. An interaction locating module of the item management application is accordingly provided in this embodiment, which is again started at a step 701 after the application loading of step 402, and instantiated as a daemon listening to the respective output of main steps 403 and 408, 410.

In this embodiment, a first question is asked at step 702 about whether a new data record has been generated by the item management application whereby, when the item management application has received provider data from a connected item provider device 120 for generating a new data record, and generated same at parallel step 403, the question 702 is answered positively and, at step 703, the provider user account identifier is requested from the item management application, and the interaction locating module fetches locating data, being either a geographical location or a network location or both, stored within the provider user account data.

At step 704, the interaction locating module next extracts, or otherwise fetches, either a geographical location or a network location or both, as a function of the type of locating data stored within the provider user account data, of the item provider device 120 from which the item data was received to generate the data record, then compares both sets of locating data of a match in order to qualify and thus validate the geographical and/or origin of the generated data record.

Alternatively the first question of 702 is answered negatively and, as the daemon continues to monitor the outputs of steps 403, 408, 410, a next question is asked at step 705 about whether a new logged user interaction received at step 408, corresponds to a scanning event of a QR code 186 in an analogue environment, e.g. a physical retail store.

When the question 705 is answered positively, at step 706 the interaction locating module extracts or fetches locating data, being a geographical location of the item user device 130$_{1,2}$ from which the logged user interaction data was received and so with which the QR code 186 was scanned. At step 707, the interaction locating module obtains the data record matched with the logged user interaction from step 410 and records the obtained geographical data against the matched data record, either in a database stored at the server 110 or in the blockchain data structure described with reference to FIG. 6, thus providing a digital and geolocated record of the remote analogue interaction of a user with an item 170.

Alternatively the new logged user interaction received at step 408 is not a scanning event in an analogue environment, whereby the second question of 705 is answered negatively and a next question is asked at step 708, about whether the new logged user interaction received at step 408, corresponds to a selection event of an avatar 400 in a digital environment, e.g. a digital retail store.

When the question 708 is answered positively, at step 709 the interaction locating module extracts or fetches locating data, being a network location of either the avatar 400 or the user device $130_{1,2}$ from which the logged user interaction data was received or both. The network location may for instance be, respectively, the uniform resource locator ('URL') of a website or social media page containing the avatar 400 and/or the Internet Protocol ('IP') address in the WAN 129 of the remote terminal hosting that website or social media page; or the IP or media access control ('MAC') address of the user device $130_{1,2}$.

At step 710, the interaction locating module obtains the data record matched with the logged user interaction from step 410 and records the obtained network data against the matched data record, again either in a database stored at the server 110 or in the blockchain data structure described with reference to FIG. 6, thus providing a digital and network-located record of the remote digital interaction of a user with the digital version of an item 170. The interaction locating daemon then resumes listening to the respective outputs of main steps 403 and 408, 410, and so on and so forth.

It will be easily understood by the skilled person that many implementing variations may be provided to the embodiments described with reference to FIGS. 4 to 7, whether individually or as combinations. In particular, one embodiment considers usefully configuring the interaction locating daemon to proactively notify item user devices $130_{1-N}$ of geographically-proximate items 170 within a physical environment, substantially in real-time (allowing for any network latency inherent to the environment of FIG. 1, and any degree of periodicity in the device position-polling for the sake of avoiding accelerated depletion of its battery).

This embodiment relies upon associating or linking data records with an item user account, for instance with a user selection of an avatar 400 recorded as an expression of interest in the corresponding physical item 170; recording geographical location(s) of such physical item(s) 170 in the corresponding data record, for instance as part of steps 702 to 704; determining the geographical location of the user device $130_N$, whilst authenticated for access through the item user account login, for instance by polling the device's GPS module in near-real-time; comparing the recorded geographical location(s) of the physical item(s) 170 and the determined geographical location of the user device $130_N$; and when the comparison shows the respective geographical locations to be within a predetermined, preferably item user-adjustable, distance of each other, for example 50 meters, sending the avatar 400 corresponding to the linked data record to the user device $130_N$ as a notice of item proximity.

With reference now to FIG. 8 now, a logical diagram illustrates the contents of the memory means 309 of the server device 110 at runtime, when the device is configured for recording user interaction with items, with the logic of embodiments of the method as described with reference to FIGS. 4, 5, 6 and/or 7 embodied as a set of instructions for the data processing unit 301. In this respect, embodiment-specific subsets of instructions and their respective data are shown in dotted lines in FIG. 8 to illustrate their optional and complementary character.

An operating system is first shown at 801 which, if the server device 110 is for instance a DELL® PowerEdge® computer manufactured by DELL® Inc. of Round Rock, USA, is Windows Server® 2019 distributed by Microsoft® Inc. of Redmond, USA. The OS 801 includes communication subroutines 802 to configure the data processing terminal 110 for bilateral network communication via the NIC 311. The OS 801 also includes input subroutines 803 for reading and processing input data variously consisting of user direct input to the keyboard 303 and the mouse 204.

The item management application loaded at step 402 is shown at 804, which configures the server 110 to perform data processing steps described hereinbefore with reference to any of FIGS. 4, 5, 6 and/or 7, for recording multimodal user interaction with both analogue and digital items, in the networked environment of FIG. 1. The application 804 is interfaced with the OS 801, particularly the network communication processing subroutines 802 of the OS 801, via one or more suitable Application Programmer Interfaces 805.

The social media module described with reference to FIG. 5 is shown at 806, the blockchain module described with reference to FIG. 6 is shown at 807 and the interaction locating module described with reference to FIG. 7 is shown at 808, with all three modules depicted as distinct subsets of the main item management application 804.

A database structure is shown at 810, in which each item data record 811 generated at step 403, its respective unique identifier codes 184 generated at step 404, its respective item avatars 400 generated at step 405 and its machine-readable tag 186 generated at step 406 are all stored. Subject to the embodiment, the database 810 may further store user accounts 812 useable by each of the social media module 806, the blockchain module 807 and the interaction locating module 808.

Social media content processed and stored by the social media module 806 is shown at 813, comprising alphanumerical, image and audio-video data input by item users through the social media functionality described hereafter. Geographical and network address data processed and stored by the interaction locating module 808 is shown at 814, comprising positional coordinates, network-IP-MAC addresses and URLs obtained according to steps 703, 704, 706 and 709.

Network messages sequentially received by the server 110 from remote item user terminals $130_{1,2}$, typically containing scanned machine-readable tag data, and sequentially sent by the server 110 to the remote item provider terminal 120, typically containing avatar data, are generally shown at 815. Network messages sequentially received by the server 110 from the remote item provider terminal 120, typically containing item data and in particular item image data 182 for the generating of new data records, are shown at 816.

Further local data 817 and network data 818 may be stored in the memory means 309 of the server 110 at runtime, some or all of which may be processed either by the application 804, or by or for other application(s) being processed in parallel with the application 804. An example of further local data is for instance local user input 817 read by the OS 801 in real time from the keyboard 303 or mouse 304. An example of further network data is for instance remote application or OS updating data 817 communicated by a remote server across the network 129.

FIG. 9 details steps of a main logic performed by an item interaction application at each item consumer device 130$_{1,2}$ shown in FIGS. 1 and 2 for logging multimodal user interaction with items in real and digital environments and recording same at the server 110 according to the logic of embodiments of the method as described with reference to FIGS. 4, 5, 6 and/or 7 hereinbefore.

After powering up the user device 130 conventionally, an operating system ('OS') is loaded into the data processing unit memory 201 and started locally at step 901, including communications subroutines of the OS and its user interface is eventually instantiated on the display 209. An item interaction application is next loaded into the data processing unit memory 202 and started locally at step 902, which configures the user device to generate a user interface for the application and to interface the device camera 211, and optionally the GPS module also, with the application.

At step 903, the local application authenticates access to the server 110, for instance with the device user inputting login credentials corresponding to the server-stored user account credentials in the interface, whence a secure session may be initialised at step 502.

A first question is then asked at step 904, about whether the user has invoked the machine-readable tag scan functionality of the local application with a relevant user selection in the application interface. When the question of step 904 is answered positively, at step 905 the local application invokes the device camera 211 which scans the machine-readable tag 186 on the label 180 secured to a physical item 170 adjacent the user and device, causing the local app to log a corresponding user interaction event and to communicate it to the server 110, at which it is recorded pursuant to step 408, 410, 411. In this embodiment, the server 110 answers the data network message of step 905 with a reply network message including the avatar 400 corresponding to the data record matched at step 410, which the local application receives at step 906 and renders in its interface. In this respect, the scanning operation results in the receipt of digital information about the item 170, rather than item pictures getting saved or being forwarded to a webpage or webform.

Subsequently to step 906, or when the question of step 904 is answered negatively, a next question is asked at step 907, about whether the user has invoked the social media functionality of the local application with a relevant user selection in the application interface. When the question of step 907 is answered positively, a next question is asked at step 908, about whether the user has selected an avatar 400 in the application interface. The selectable avatar may be either the same as received at the preceding step 906, or another avatar in a list thereof received according to principles described hereafter.

The avatar selection question 908 is a procedural check to enforce a condition that user content should only be uploaded to the server 110 if it includes at least one unique identifier code 184 extracted from the avatar 400. So long as the question of step 908 remains unanswered, the local application awaits a corresponding input, by way of selection, from the user in the interface. If a next input to the interface is not an avatar selection, then the question of step 908 is answered negatively and the logic returns to the initial question of step 904.

Alternatively, the next input to the interface after invoking the social media function is an avatar selection, wherein the question of step 908 is answered positively, whereby the local application encodes the ensuing local input as social media content together with the unique identifier code 184 extracted from the avatar 400 at step 909, then uploads it to the server 110 at step 910, whence it is received as item user social media content for processing according to steps 504 to 508.

Subsequently to step 910, or when the question of step 907 is answered negatively, a next question is asked at step 911, about whether the user has invoked the item management and preferences functionality of the local application with a relevant user selection in the application interface. The item management and preferences functionality implements the removable linking of the user account authenticated at step 903 with one or more data records remotely at the server 100, effectively generating a discrete list when several data records are so linked. This function thus implements, in the example case of garment items such as the blouse 170, a digital wardrobe of physical garments owned and/or desired by the user of the mobile device 130.

Accordingly, when the question of step 911 is answered positively, the item interaction application initially requests the list of data records linked with the authenticated user account from the remote server 110 at step 912, then receives avatar(s) 400 for each data record from the server 110 and renders same in the local user interface at step 913. At step 914, the user may then either select a new avatar for linking, and thus its inclusion into the list, through the selection of a new avatar received at previous step 906; or select a listed avatar for cancelling the linking, and thus removal from the list, through the selection of a listed avatar received at previous step 913.

When the question of step 911 is answered negatively however, the logic proceeds to a last question about whether the item interaction application should be closed. When the last question of step is answered positively, the item interaction application is unloaded from the memory 202, conversely when the last question is answered negatively, the logic returns to the question of step 904, wherein a tag 180 may be scanned for a next, different physical item 170, and so on and so forth.

With reference now to FIG. 10 now, a logical diagram illustrates the contents of the memory means 202 of an item user device 130$_{1,2}$ at runtime, when the device is configured for logging user interaction according to the logic described with reference to FIG. 9, embodied as a set of instructions for the data processing unit 201 Again, embodiment-specific subsets of instructions and their respective data are shown in dotted lines in FIG. 10 to illustrate their optional and complementary character.

An operating system is first shown at 1001 which, if the item user device 130 is for instance an iPhone® mobile phone handset or an iPad® tablet computer manufactured by Apple® Inc. of Sunnyvale, USA, is iOS® likewise distributed by Apple® Inc.; or, if the item user device 130 is for instance a Galaxy® mobile phone handset manufactured by Samsung® Electronics Co., Ltd of Suwon, Republic of Korea, is Android® distributed by Google® Inc. The OS 1001 includes communication subroutines 1002 to configure the data processing terminal 130 for bilateral network communication via the modem 203 and both the NIC 206A and the NFC module 206B. The OS 1001 also includes input subroutines 1003 for reading and processing input data variously consisting of user direct input to the keypad 208 and to the touchscreen interface 209, image data captured by the CCD 211 and audio data supplied by the DAC 204 after processing input from the microphone 210.

The tem interaction application loaded at step 902 is shown at 1004, which configures the item user device 130 to perform data processing steps 902 to 914 as described hereinbefore with reference both to FIGS. 4 to 7 and 9, for recording and logging analogue and digital interactions with items, such as the blouse 170, in the networked environment of FIG. 1. The application 1004 is interfaced with the OS 1001, particularly the network communication and input data processing subroutines 1002 and 1003 of the OS 1001, via one or more suitable Application Programmer Interfaces 1005.

The social media function which can be invoked by the user at step 907 is a subset of instructions of the item interacting module 1004 and shown at 1006. An interaction locating applet or hook for invoking the device's GPS module and/or NIC/WNIC modules 206A/B to encode geographical and/or network data in network messages to the server's interaction locating module 808 is another subset of instructions of the item interacting module 1004 and shown at 1007.

The application user interface rendered at step 902 is shown at 1008 and illustrated to alternatively include either a scanned machine-readable tag 186 after performing step 904, or one or more avatar(s) 400 respectively after performing steps 905, 913.

The local user account credential(s), and the corresponding secure network session with the server 110 initialised at step 903, is shown at 1009. Social media content generated locally according to step 909 and comprising alphanumerical, image and audio-video data input by the user through the interface is shown at 1010, and geographical and/or network address data obtained locally by the location module 1007 for encoding into server-addressed messages is shown at 1011.

Network messages sequentially received by the user terminal 130 from the server 110, typically containing avatar data, and sequentially sent by the user terminal 130 to the server, typically containing scanned machine-readable tag data and encoded social media data 1010, are generally shown at 1012.

Further local data 1013 and network data 1014 may be stored in the memory means 202 of the mobile phone 130 at runtime, some or all of which may be processed either by the application 1004, or by or for other application(s) being processed in parallel with the application 1004. An example of further local data is for instance local user input 1013 read by the OS 1001 in real time from the hardware interface 209. An example of further network data is for instance remote application or OS updating data 1014 communicated by a remote server across the telecommunication network 190.

With reference to FIG. 11 now, data flows between the plurality of data processing devices 110, 120, 130$_{1,2}$ of FIGS. 2 and 3 are illustrated in the networked environment of FIG. 1 according to the methodology described with reference to FIGS. 4 to 10, in a typical use of the system according to the invention.

New item data is generated at the location 1101 of the garment manufacturer, including at least an image, photograph or other pictorial representation 182 of the item 170, and sent to the server device 110. The server 110 generates the data record 411, the respective unique identifier code 184, the respective avatar 400 encoding both the item image 182 and respective unique identifier code 184, the machine-readable tag 186 encoding the respective unique identifier code 184, and prints labels 180 comprising the item image 182 and a machine-readable tag 186 encoding the respective unique identifier code 184 at a remote location 1102.

The printed labels 180 are sent either (1103) to the garment manufacturer for securing to blouses 170 prior to their shipping (1104) to a physical store 1105, or (1106) to the physical store 1105 already stocking the manufacturer's item 170. Alternatively a data file is sent (1107) by the server 110 to the item provider terminal 120 across the WAN 129 after completing step 406, for local printing and securing to items 170 prior to their shipping (1104) to physical store(s) 1105.

A first user operating an item user device 130$_1$ visits the physical store 1105, sees the physical blouse 170, starts (902) the item interaction application 1004, scans (905) the QR code 186 on the label 180, receives (906) the corresponding item avatar 400 from the server 110 which is then rendered in the user interface 1008. The user wishes to inform a friend about the blouse 170 at the store 1105 and so invokes (907) the social media function of the item interaction application, selects the received avatar 400 in the user interface, inputs a suitable comment or greeting by way of social media content (909) and sends (910) the social media post to the server 110. At the server 110, each of the QR code scan event and the social media posting event is recorded as a distinct logged interaction of the first user.

The friend of the first user is a second user operating another item user device 130$_2$ and situated remotely from the first user. Pursuant to step 508, the social media post of the first user about the item 170 at the store 1105 and containing the respective avatar 400 thereof is pushed to the second item user device 130$_2$, immediately if the second item user device 130$_2$ is currently connected to the server 110, or when it next connects to the server 110 again, if it is not.

The second user eventually sees the blouse avatar 400 included in the received social media post and wishes to eventually go see it at the store 1105. The second user starts (911) the item management and preferences application 1004, the application requests (912) the list of garments owned and desired by the second user and then receives (913) the avatars corresponding to the linked data records, the second user then selects (914) the avatar 400 received in the social media post of the first user pushed by the server 110 for inclusion in the list. At the server 110, each of the avatar selection in the pushed social media post at the second item user device 130$_2$ and its inclusion as a desired garment in the second user's list is recorded as a distinct logged interaction of the second user.

The server 110 accordingly now stores an auditable record of two users' respective interactions with a same garment in both its physical and digital forms 170, 400, at distinct locations and irrespective of their analogue and digital contexts, which the operator of the server 110 may subsequently make available to the garment manufacturer for resources, production, stockholding and delivery planning, besides organisational, financial and further non-technical purposes.

With reference to FIGS. 12 to 16 now, embodiments of the system according to the invention are shown in use which, pursuant to the principles of the invention described herein, allow an item user to obtain information in digital format about an item 170 from a retail store 1105$_{1-N}$ or an online store hosted at an item provider terminal 120$_{1-N}$, as the avatar 400 including the digital picture 182 of the item, by scanning the special label 180 associated with each physical instance of the item 170, which comprises the unique unified digital code 184 in machine-readable form 186, and then saving it, by way of associating data structures logically, in an account 412 created by the item user within the server application 804.

The system and method of the invention allows a manufacturer, retailer or brand owner operating one or more provider terminal(s) $120_{1-N}$ to upload digital information about an item 170, such digital information always including at least a digital representation 182 of the item such one or more digital photograph(s), computer-generated render(s) or even three-dimensional structure(s) with relevant texture(s), over the internet 129. The system and method of the invention then generates a unique unified digital code 184 specifically for the received information, which may optionally be saved, by way of associating data structures logically, in a user account 412 created by the item provider within the system at or prior to step 502; encodes the code 184 into a physical machine-readable tag 186 that is printed as a label 180, or recorded in a NFC or RFID device 180, and secured to each physical instance of the item 170.

The system and method of the invention provides for retrieving and sending the digital information to the remote personal computers $120_{1-N}$, $130_{1-N}$; saving (914) digital information 184 of the item 170 in an account 412 assigned to each remote personal computer $120_{1-N}$, $130_{1-N}$; and retrieving the saved data (913) in response to a subsequent access (502, 903, 911) of the user interaction management application 804 by the remote personal computer $120_{1-N}$, $130_{1-N}$, wherein scanning the label 180 associated with an item 170 using the user interaction application 1004 on the personal computer $120_{1-N}$, $130_{1-N}$ causes execution of instructions (904-914) by the remote personal computer, which then cause execution of instructions (408-411, 505-508, 603-607, 702-712) by the central server 110 via communication over the internet 129.

Embodiments of the methodology disclosed herein may further include configuring the user interaction application 1004 to provide options to the item user at their device 130, to purchase the item 170 directly from the provider 1101 or from one or more retailers $1105_{1-N}$.

Each retail and online shop $1105_N$, $120_N$ may be assigned a respective Place of Scan ID ('PSID') corresponding to the geographical and/or network address data 814. This positional data may be subsequently used to compute data for organisational purposes such as supply chain management, or further purposes such as quantifying consumer engagement levels with an item 170 or even revenue sharing between entities within the supply chain of the item 170, inclusive of the online and retail shops $1105_{1-N}$, $120_{1-N}$ constituting same, by identifying and aggregating discrete scanning interaction events according to positional data. Thus, virtuous relationships arise between retail and online shops 1105, 120, as instances of item users viewing physical item 170 in retail stores 1105, but proceeding to purchase them online, and reciprocal instances, can now be better qualified and quantified.

Personal user accounts 412 within the user management application 804 of the invention are preferably accessible from any network-connectable device apt to perform steps 901 to 914, inclusive of smartphones as described with reference to FIG. 2, desktop computing devices as described with reference to e.g. FIG. 3, and functional hardware equivalents variously tablet computers, portable games consoles, digital media players and more. The user interaction application 1004 of the invention may be downloaded onto such network-connectable devices, or hosted remotely as a web-based/software-on-demand application that is accessed through such network-connectable devices using an internet browser application.

In a fashion-oriented embodiment of the item interaction application 1004, digital information of each of several garments $170_{1-N}$, which includes a respective digital picture 182, can first be added to an item user's personal account 412 within the item management application 804, and then combined and viewed in the user interface 1008 with information and pictures $182_{2-N}$ of the other items $170_{2-N}$ to coordinate and preview different outfits. Items $170_{1-N}$ of different providers 11011-N, can be scanned, saved, combined and used by item users within this embodiment of the user interaction application 1004.

Item users thus have access to many providers 11011-N and their respective shops and distribution channels $1105_{1-N}$, $120_{1-N}$ by simply entering their account data 412 in the application 1004 at step 903 on a computing device $130_{1-N}$, as the personal account 412 of the item user common to both the item management application 804 and the item interaction application 1004 is hosted on the computer platform 804, 810 of the invention.

The information relevant to revenue sharing is allocated to the user account 412 of item providers 1105. Each item provider account 412 can be associated with many distinct distribution outlets $1105_N$, $120_N$, each with its own PSID. Each item provider 1101 has access to the global data relating to its item 170, including locations 814 at which item users have scanned it, when and where it was purchased, all social media data 813 related to it and further functionalities such as financials and their calculation. All item provider accounts 412 and their communications with the central sever 110 are walled off from, and independent of, each other. The providers 1101 are not connected to each other and have no information about each other's data, but collect logged user interaction relating to its items only, in order to aggregate objective and quantified user behavioural data pertaining to an item purchasing interest and eventual decision.

The system and method of the invention thus allows item manufacturers 1101 and/or retailers 1105 to provide information about their items 170 in digital form 400 to their target audience, and allows them to receive user interaction data 1012, variously as tag scans, social media content and avatar selections logged at item user devices 130, as digital data objectively and quantifiably qualifying consumption behaviours that are inherently subjective and analogue. In this context, the unified digital codes 184 can only be generated and communicated bilaterally according to the method and within the system of the invention, as implemented at the server 110 configured by the item management application 804 and each item user device 130 configured by the item interaction application 1004.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as a read-only memory ("ROM"), an optical recoding medium or a magnetic recording medium. The carrier may be an electrical or optical signal which may be transmitted via an electrical or an optical cable or by radio or other means.

The invention is not limited to the embodiments hereinbefore described but may be varied in both construction and detail. For example, it will be readily understood by skilled persons that the inventive principles disclosed herein in relation to hardware architectures and/or components and/or their arrangement may be permanently integrated into the standard configuration of a micro-processor through relevant manufacturing techniques.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention claimed is:

1. A method of recording multimodal user interaction with an item in a networked system, the networked system comprising at least one server device connected to at least one client device across at least one network, the method comprising the steps of
generating a data record comprising data representative of the item, the data including at least image data depicting the item;
generating and associating a unique identifier code with the data record, wherein associating at least the image data in the data record with the unique identifier code defines an avatar of the item in the networked system;
generating and storing a user account for each user of the networked system, each user account having at least one respective type selected from a group comprising at least an item provider and an item consumer;
removably linking at least one data record with at least one user account;
authenticating access of the at least one client device to the networked system through logging the client device into the respective user account of the client device's user;
distributing one or more copies of the avatar to the at least one client device;
encoding the unique identifier code into a machine-readable tag and securing the tag to each physical embodiment of the item outside the networked system;
at the at least one client device, logging digital user interaction with the avatar and analogue user interaction with the physical item, wherein logging analogue user interaction comprises reading the machine-readable tag with the client device; and
matching and recording each logged user interaction against the item data record at the at least one server device.

2. A method according to claim 1, wherein the step of logging analogue user interaction comprises the further steps of
determining a geographical location of the client device; and
associating the determined location with the reading of the machine-readable tag.

3. A method according to claim 1, wherein the step of logging digital user interaction comprises the further step of
determining a network location of the distributed avatar;
optionally determining a geographical location of the network location;
associating at least the network location with the digital user interaction.

4. A method according to claim 1, wherein at least one of
the item provider of the group of selectable user account types further comprises an item manufacturer type and an item retailer type; and
the group of selectable user account types further comprises an item referrer and a third party data supplier.

5. A method according to claim 1, comprising the further steps of matching and recording each logged user interaction against the respective user account of the client device logging the user interaction.

6. A method according to claim 1, wherein a data record comprising data representative of the item can only be generated at a client device logged into a user account of the item provider type.

7. A method according to claim 1, comprising the further steps of
generating and storing a list of each data record linked with a user account; and
updating the list according to logged user interaction recorded against the user account.

8. A method according to claim 1, wherein the step of distributing one or more copies of the avatar to the at least one client device further comprises distributing the said copies according to the list of data record(s) linked with the user account authenticating a client device.

9. A method according to claim 1, comprising the further steps of
determining a first geographical location, being a location of a client device logged into a user account;
determining a second geographical location, being a location of least one physical item having a respective data record linked with the user account; and
when the first and second geographical locations are within a predetermined distance of each other, distributing a copy of the avatar corresponding to the data record of the item to the client device logged into the user account, as a notice of item proximity.

10. A method according to claim 7, wherein the logged user interaction at the list updating step is digital or analogue user interaction representative of a transaction for a physical embodiment of the item outside the networked system.

11. A method according to claim 1, comprising the further steps of
providing each client device with a messaging interface to all other client devices in the networked system;
allowing each client device to message one or more remote client devices in the networked system through the interface; and
preventing a message from being sent in the networked system until and unless at least one logged user interaction is associated with the message.

12. A method according to claim 1, wherein
the step of generating a data record comprising data representative of the item comprises the further step of encoding the item data record in a blockchain data structure; and
the step of recording each logged user interaction against the item data record comprises the further step of encoding each matched logged user interaction against the item data record in the blockchain data structure.

13. A method according to claim 12, wherein data representative of the item in the data record encoded in the blockchain data structure includes at least image data depicting the item and authentication data guaranteeing a manufacturing origin of each physical embodiment of the item.

14. A system for recording multimodal user interaction with an item, the system comprising at least one server device connected to at least one client device across at least one network, wherein the or each server is configured to—
generate a data record comprising data representative of the item, the data including at least image data depicting the item;
generate and associate a unique identifier code with the data record, wherein associating at least the image data in the data record with the unique identifier code defines an avatar of the item in the system;
generate and store a user account for each user of the networked system, each user account having at least one respective type selected from a group comprising at least an item provider and an item consumer;
authenticate access of the at least one client device to the networked system through logging the client device into the respective user account of the client device's user;
removably link at least one data record with at least one user account;
distribute one or more copies of the avatar to the at least one client device; and
match and record each user interaction logged at the at least one client device against the data record;

the system further comprising at least one machine-readable tag, into which the unique identifier code is encoded and which is secured to each physical embodiment of the item outside the system; and wherein the at least one client device is configured to log digital user interaction with the avatar to log analogue user interaction with the physical item by reading the at least one machine-readable tag secured thereto.

* * * * *